United States Patent
Kabemoto et al.

[11] Patent Number: 5,377,324
[45] Date of Patent: Dec. 27, 1994

[54] EXCLUSIVE SHARED STORAGE CONTROL SYSTEM IN COMPUTER SYSTEM

[75] Inventors: Akira Kabemoto, Yokohama; Toshio Ogawa, Fuchu; Masashi Shirotani, Minami-showa, all of Japan

[73] Assignee: Fujitsu Limited, Kawasaki, Japan

[21] Appl. No.: 856,919

[22] PCT Filed: Sep. 18, 1991

[86] PCT No.: PCT/JP91/01239
§ 371 Date: May 18, 1992
§ 102(e) Date: May 18, 1992

[87] PCT Pub. No.: WO92/05490
PCT Pub. Date: Apr. 2, 1992

[30] Foreign Application Priority Data

Sep. 18, 1990 [JP] Japan ................. 2-248206

[51] Int. Cl.5 ................................. G11B 13/00
[52] U.S. Cl. ......................... 395/200; 395/425
[58] Field of Search ........... 395/200, 275, 250, 425, 395/375

[56] References Cited
U.S. PATENT DOCUMENTS
5,201,039 4/1993 Sakamura .................. 395/375

FOREIGN PATENT DOCUMENTS
57-25053  2/1982 Japan.
57-211628 12/1982 Japan.
59-85547  5/1984 Japan.
59-116866 7/1984 Japan.
61-165170 7/1986 Japan.
63-29296  6/1988 Japan.

Primary Examiner—Robert L. Richardson
Attorney, Agent, or Firm—Staas & Halsey

[57] ABSTRACT

The present invention comprises a plurality of processor modules and shared storage modules connected through a system bus. It improves system performance by limiting the range and shortening the time of exclusive control when a CSI (compare and store interlocked) instruction is executed to rewrite the contents of a shared storage if read data at an accaccaccess address of a shared storage coincide with the data anticipated by a CPU. In the present invention, when the CPU of the processor module rewrites data by addressing any shared storage module in executing a CSI instruction, the CPU has a connection unit connected through a system bus of a shared storage module recognize the CSI instruction, and reads data and compares them with comparison data in the shared storage module. Thus, the range of the exclusive control is limited to the process in the internal bus in the shared storage module.

7 Claims, 26 Drawing Sheets

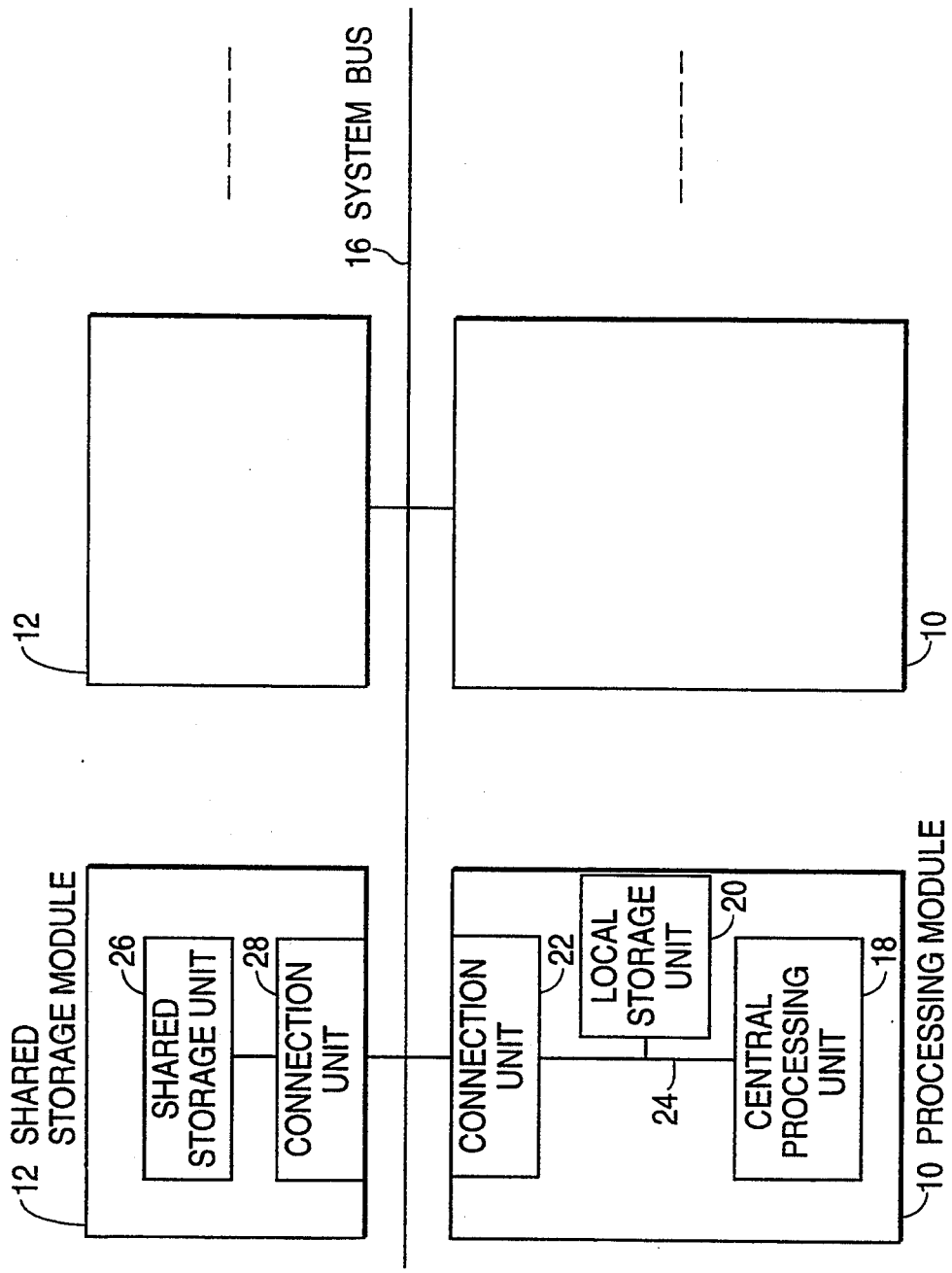

FIG. 12

60 FIRST CONTROL REGISTER

| 11101001 | ******* | ******* | ******* |
|---|---|---|---|

IIIIIII
01234567

I0(INSTALL 0) ..... SPECIFYING EXISTENCE/NON-EXISTENCE OF SSM CORRESPONDING PARTIAL SSU SPACE #0
I1(INSTALL 1) ..... SPECIFYING EXISTENCE/NON-EXISTENCE OF SSM CORRESPONDING PARTIAL SSU SPACE #1
I2(INSTALL 2) ..... SPECIFYING EXISTENCE/NON-EXISTENCE OF SSM CORRESPONDING PARTIAL SSU SPACE #2
...
I7(INSTALL 7) ..... SPECIFYING EXISTENCE/NON-EXISTENCE OF SSM CORRESPONDING PARTIAL SSU SPACE #7

I0 ~ I7    0 ..... SPECIFYING NON-EXISTENCE OF SSM CORRESPONDING TO EACH PHYSICAL ADDRESS
           1 ..... SPECIFYING EXISTENCE OF SSM CORRESPONDING TO EACH PHYSICAL ADDRESS

FIG. 13

62-1 SECOND CONTROL REGISTER

| 0 | 0000000 | 0 | 0000001 | 1 | 0000010 | * | ****** |
|---|---------|---|---------|---|---------|---|--------|
| D0 | UID0 | D1 | UID1 | D2 | UID2 | D3 | UID3 |

62-1

| 1 | 0000101 | * | ****** | * | ****** | 0 | 0000111 |
|---|---------|---|--------|---|--------|---|---------|
| D4 | UID0 | D5 | UID1 | D6 | UID2 | D7 | UID3 |

D0 ...... SPECIFYING CONFIGURATION ACCESS MODE OF SSM CORRESPONDING TO PARTIAL SSU SPACE #0
D1 ...... SPECIFYING CONFIGURATION ACCESS MODE OF SSM CORRESPONDING TO PARTIAL SSU SPACE #1
D2 ...... SPECIFYING CONFIGURATION ACCESS MODE OF SSM CORRESPONDING TO PARTIAL SSU SPACE #2
.
.
D7 ...... SPECIFYING CONFIGURATION ACCESS MODE OF SSM CORRESPONDING TO PARTIAL SSU SPACE #7

UID0 ~ 7 ...... SPECIFYING UNIT-ID IN SSBUS OF SSM CORRESPONDING TO EACH PARTIAL SSU SPACE. DUPLEX CONFIGURATION OF SSU IS FIXED WITH THE LOWEST ORDER UID BIT OF '0' OR '1'.

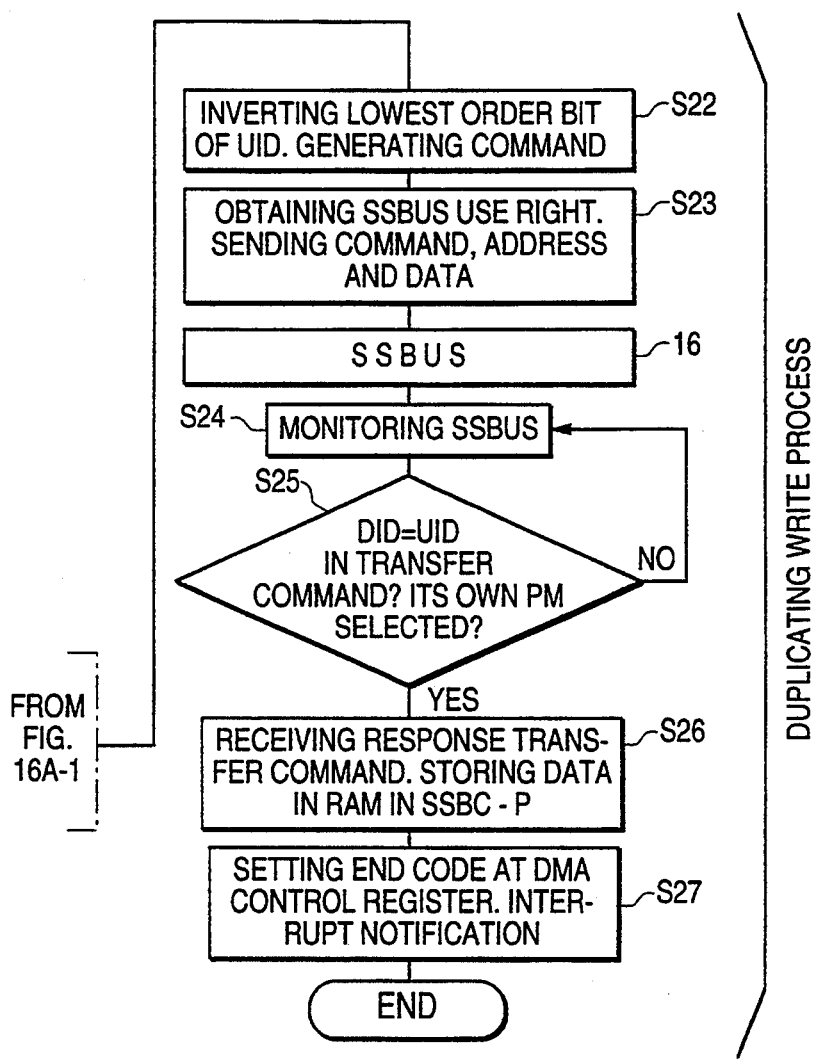

EXCLUSIVE SHARED STORAGE CONTROL SYSTEM IN COMPUTER SYSTEM

FIELD OF THE INVENTION

The present invention relates to an exclusive control system on the side of a shared storage of a multiprocessor system in which a plurality of processor modules and a plurality of shared storage modules are connected together by a system bus.

BACKGROUND OF THE INVENTION

Normally, necessary instructions and data to be used by a processor are stored in a shared storage of a multiprocessor system, Each of the processor modules frequently accesses the shared storage. In this connection, exclusive instructions are indispensable for accesses to a shared storage, and among them is a CSI (compare and store interlocked) instruction for substituting or rewriting data when it is determined that data read from a shared storage coincides with the data expected by software. However, when a CSI instruction is executed, an exclusive control is performed such that a system bus between a processor module and a shared storage module is exclusively occupied until the end of the instruction. During the execution of the CSI instruction, no other processor modules are permitted to access the system bus, thereby greatly reducing the system performance. Therefore, it is requested that the range of the exclusive control and the time taken for it to execute a CSI instruction are limited to the least possible extent.

As shown in FIG. 20, a conventional multiprocessor system forms a computer system referred to as a multiprocessor system in which a plurality of processor modules 10 and a plurality of shared storage modules 12 are connected through a system bus 16 for transmitting data.

Thus, exclusive instructions are required to access a shared storage in a multiprocessor system, and a CSI instruction is one of them.

As shown in FIG. 21, the operation sequence of a CSI instruction is fixed such that, when the data of a certain address at which the shared storage comprising a plurality of shared storage modules (SSM) 12 is located are to be rewritten, access address data can be read and actually rewritten if the read data coincides with the data anticipated by a central processing unit ($\mu$P) 18 of the processor module 10 to be stored at the access address.

After the access address data are read, the CSI instruction performs exclusive control so that another central processing unit 18 in other processor modules 10 cannot access and update the access address while the comparison results in coincidence and the address data are rewritten.

DISCLOSURE OF THE INVENTION

The conventional exclusive control of a shared storage during the execution of a CSI instruction covers all the path from a central processing unit 18 in an accessing processor module 10 to a shared storage module 12 to be accessed through the system bus 16 in a shared storage space as shown by the bold line in FIG. 20. Additionally, the exclusive control spans a long time in reading, comparing, and writing data.

During the exclusive control, other central processing unit 10 in other processor modules 10 cannot access the shared storage module 12. Therefore, the CSI instruction has been a cause of great deterioration in system performance.

The present invention has been developed to solve this problem and aims at providing a shared storage exclusive control method for improving the system performance by limiting the range and shortening the time of the exclusive control of a shared storage by a CSI instruction.

FIG. 1 is a block diagram for explaining the principle of the present invention.

As shown in FIG. 1, the present invention relates to a computer system comprising one or more processing modules (processor modules) 10 each having at least a local storage 20, a central processing unit 18, and a connection unit 22 for connection to a system bus 16, and one or more shared storage modules 12 each having at least a shared storage unit 26 and a connection unit 28 for connection to the system bus 16.

In this computer system, the present invention has the connection unit 28 in the shared storage module 12 for recognizing a CSI instruction to read and compare data within the shared storage module 12, when the central processing unit 18 in the processor module 10 specifies an address in the shared storage module 12 to rewrite data, and if the read data at the access address coincides with the data anticipated by the central processing unit 18, and when a CSI instruction is executed to rewrite the access address content.

That is, the connection unit 22 in the processor module 10 generates an activation transfer command consisting of a destination ID code (DID) indicating a receiving shared storage module 12, a source ID code (SID) indicating a source processor module, an operand indicating a CSI instruction, and an access data capacity (BCT). Then, the connection unit 22 sends to the connection unit 28 in the shared storage module 12 to be accessed through the system bus (16) the comparison data and substitute data together with the above described activation transfer command.

In response to this, the connection unit 28 in the shared storage module 12 reads data, compares the read data with the comparison data based on the activation transfer command obtained by the receiving operation, and rewrites the data when the comparison results in coincidence. While the data are read and rewritten, an internal bus 30 in the shared storage module 12 is controlled exclusively.

When the data are successfully rewritten according to the coincident result, the connection unit 28 in the shared storage module 12 generates a response transfer command including a normal termination code and sends it to the accessing processor module 10 through the system bus 16. If the data cannot be rewritten as a result of a non-coincident output, a response transfer command including an abnormal termination code is generated and sent together with the non-coincident read data to the accessing processor module 10 through the system bus 16.

Furthermore, the connection unit 28 in the shared storage module 12 monitors the system bus 16 to receive the activation transfer command when it is determined that the destination ID code (DID) in the activation transfer command coincides with its own unit ID. The connection unit 22 in the processor module 10 monitors the system bus 16 to receive the response transfer command when it is determined that the destination ID code (DID) in the response transfer command coincides with its own unit ID.

In the exclusive shared storage control system comprising the above described configuration, data are compared during the execution of an CSI instruction not in a central processing unit in a processor module but in a connection unit for connection to a system bus in a storage module, thereby greatly limiting the range and shortening the time of an exclusive control of the CSI instruction. Therefore, the problem of deterioration in system performance caused by wide range and long duration exclusive control can be successfully solved.

BRIEF DESCRIPTION OF THE DRAWINGS

FIG. 1 is a block diagram for explaining the principle of the present invention;

FIG. 12 is a diagram for explaining SSM configuration definitions by the first control register according to the present invention;

FIG. 13 is a diagram for explaining SSM configuration definitions by the second control register according to the present invention;

FIGS. 15A-1, 15A-2 and 15B are flowcharts of an accessing process in the program mode according to the present invention;

FIGS. 16A-1, 16A-2, and 16B are flowcharts of an accessing process in the DMA mode according to the present invention;

FIG. 17 is a diagram for explaining a descriptor used in the DMA mode access according to the present invention;

SYSTEM CONFIGURATION OF AN APPARATOUS THIS SYSTEM

Figure 2:
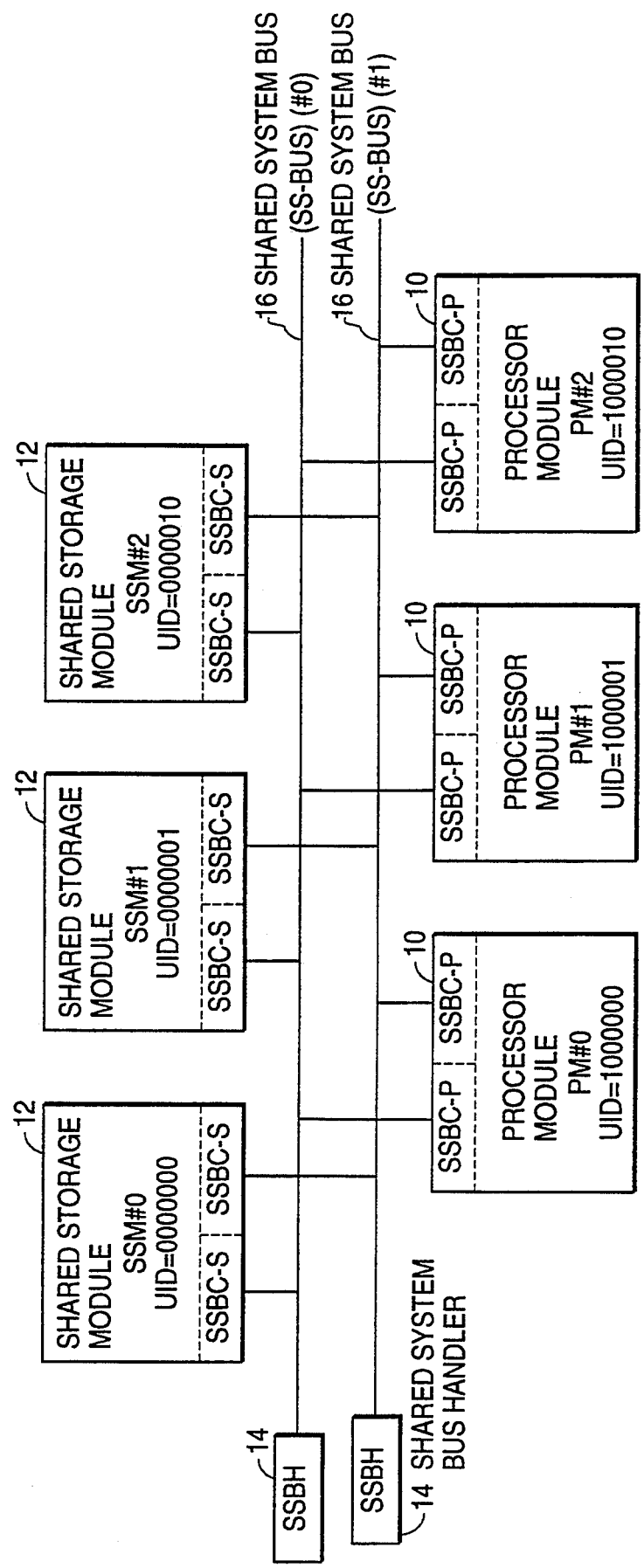
FIG. 2 illustrates a multiprocessor system configuration of the present invention.

FIG. 2 illustrates a part of the multiprocessor system configuration operated in the shared storage configuration system of the present invention.

FIG. 2 illustrates a system configuration of a multiprocessor system to which a shared storage configuration system according to the present invention is applied.

The multiprocessor system comprises more than one processor module (PM) 10 and more than one shared storage module (SSM) 12. The processor modules 10 and the shared storage modules 12 are each connected to a shared system bus (SS-BUS) 16, a split bus, through a connection unit (SSBC-P) 22. The shared system bus 16 is controlled by a shared system bus handler (SSBH) 14 and the arbitration of the shared system bus 16 is centrally controlled by the shared system bus handler 14.

The #0 to #2 processor modules 10 have their unit ID numbers allocated as follows:

PM#0; UID=1000000
PM#1; UID=1000001
PM#2; UID=1000010

Also, the #0 to #2 shared storage modules 12 have their ID numbers allocated as follows:

SSM#0; UID=0000000
SSM#1; UID=0000001
SSM#2; UID=0000010

Although the process modules 10 and the shared storage modules 12 are each controlled by the #0 and #1 shared system bus 16 which is duplicated for fault-tolerant purposes, they may be connected to more shared system buses 16.

Figure 3:
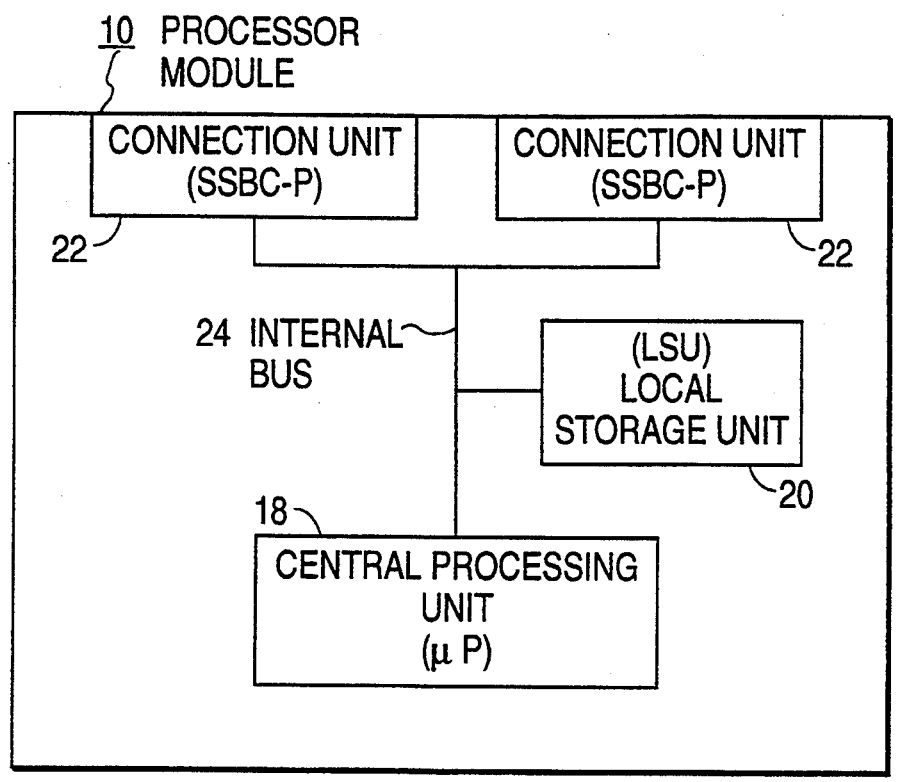
FIG. 3 is a block diagram of a processor module of the present invention.

FIG. 3 is a block diagram of the processor module shown in FIG. 2.

The processor module comprises a central processing unit ($\mu$P) 18, a local storage unlit (LSU) 20 and two connection units (SSBC-P) 22 for the two shared system buses 16, which are all connected by an internal bus 24.

In the processor module 10, software (OS) runs on the central processing unit 18 and the local storage unit 20. Pieces of software from the processor modules 10 shown in FIG. 2 cooperate with one another to form a distributed OS for performing a set of operations. The central processing unit 18 of each processor module 10 fetches instruction codes only from its local storage unit 20.

Figure 4:
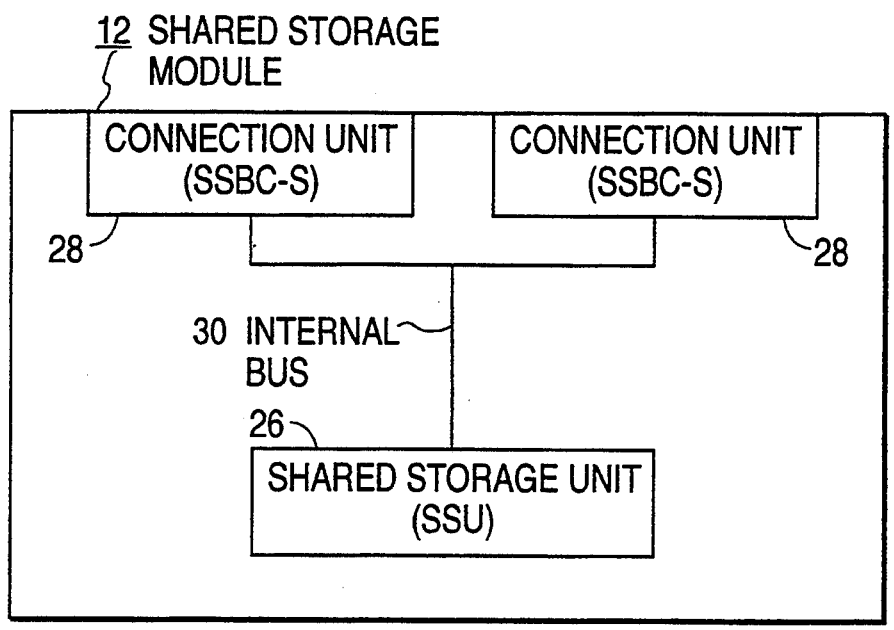
FIG. 4 is a block diagram of a shared storage module of the present invention.

FIG. 4 is a block diagram of the shared storage module 12 shown in FIG. 2.

The shared storage module 12 comprises a shared storage unit (SSU) 24 and two connection units (SSBC-S) 28 corresponding to the two shared system buses 16, which are all connected by an internal bus 30. The shared storage unit 26 stores data to be shared among the processor modules 10 shown in FIG. 2.

Figure 5:
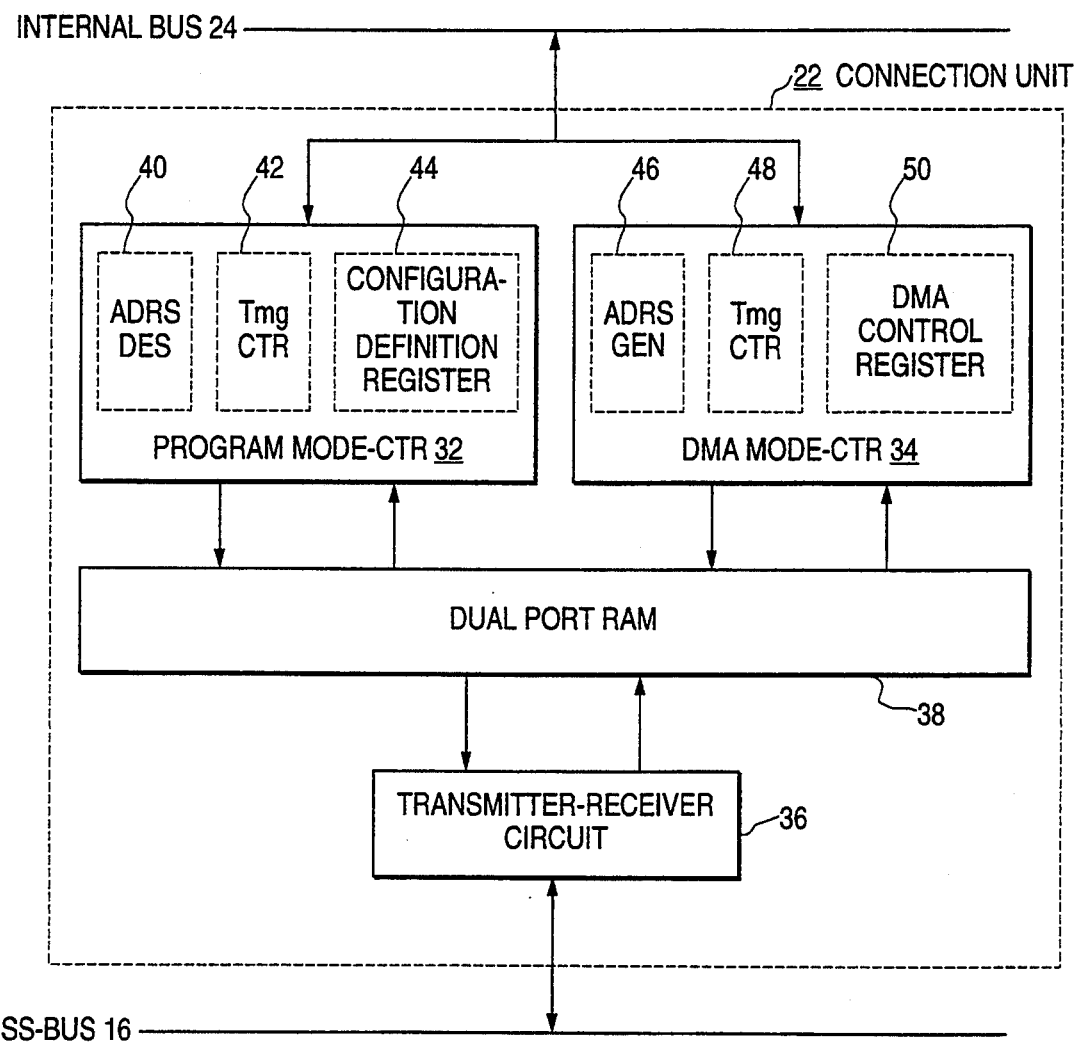
FIG. 5 is a block diagram of a connection unit of the present invention, which is built in the processor module.

FIG. 5 is a block diagram of the connection unit (SSBC-P) 22 in the processor module 10 of FIG. 3.

The connection unit 22 accesses the shared storage un unit 12 of FIG. 2 via the shared system bus 16 in the following two modes:

(1) program mode
(2) DMA mode.

The connection unit 22 comprises a program mode access control circuit 32 and a DMA mode access control circuit 34, which are provided for the two access modes. It further comprises a transmitter-receiver circuit 36 for transmitting data to or receiving data from the shared system bus 16 and a dual port RAM 38, which serves as a buffer. The program mode control circuit 32 comprises an address decoder 40, a timing controller 42, and a configuration definition register 44. The DMA mode access control circuit 34 comprises an address generator 46, a timing controller 48 and a DMA control register 50.

Figure 6:
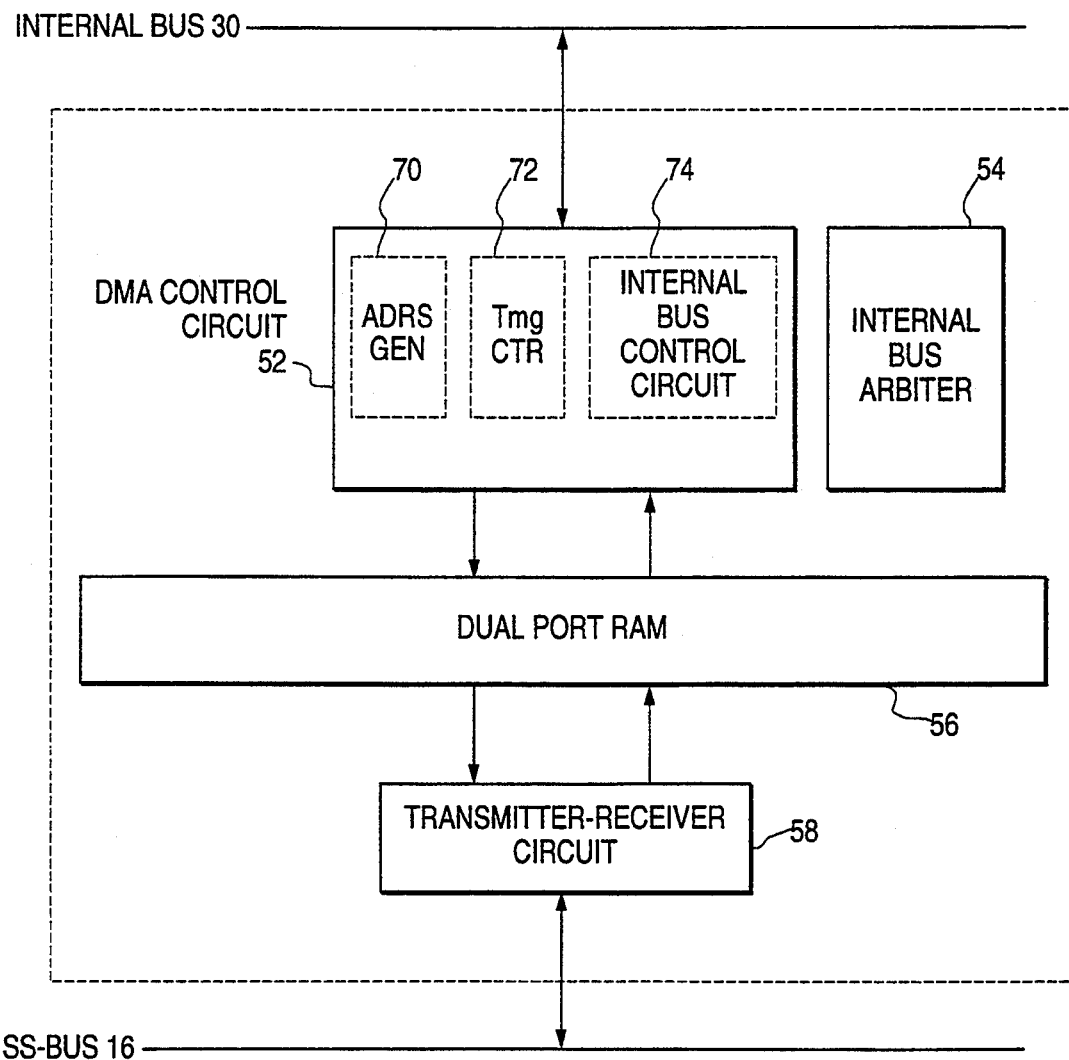
FIG. 6 is a block diagram of a connection unit of the present invention, which is built in the shared storage module.

FIG. 6 is a block diagram of the connection unit (SSBC - S) 28 of the shared storage module 12 shown in FIG. 4.

The connection unit 28 is constructed from a DMA control circuit 52 an internal bus arbiter circuit 54 a transmitter-receiver circuit 56, and a dual port RAM 58. The DMA control circuit comprised of an internal bus control circuit 74 for controlling the internal bus 30, an address generator 70 and a timing controller 72; the internal bus arbitrator circuit 54 performs the arbitration of the internal bus 30 when more than one connection unit 28 is installed in the shared storage module 12, as shown in FIG. 4; the transmitter-receiver circuit 56 is for the shared system bus 16; and the dual port-RAM 58 serves as a buffer.

The connection units 22 and 28, which make connections among the processor modules 10 and the shared storage modules 12 via the shared system bus 16, adopt a split transfer system in which each access is split into start transfer and response transfer.

In the bus control of the split transfer system, a unit ID number is allocated to each module, the unit ID being used as a module identifier on the bus.

Figure 7:
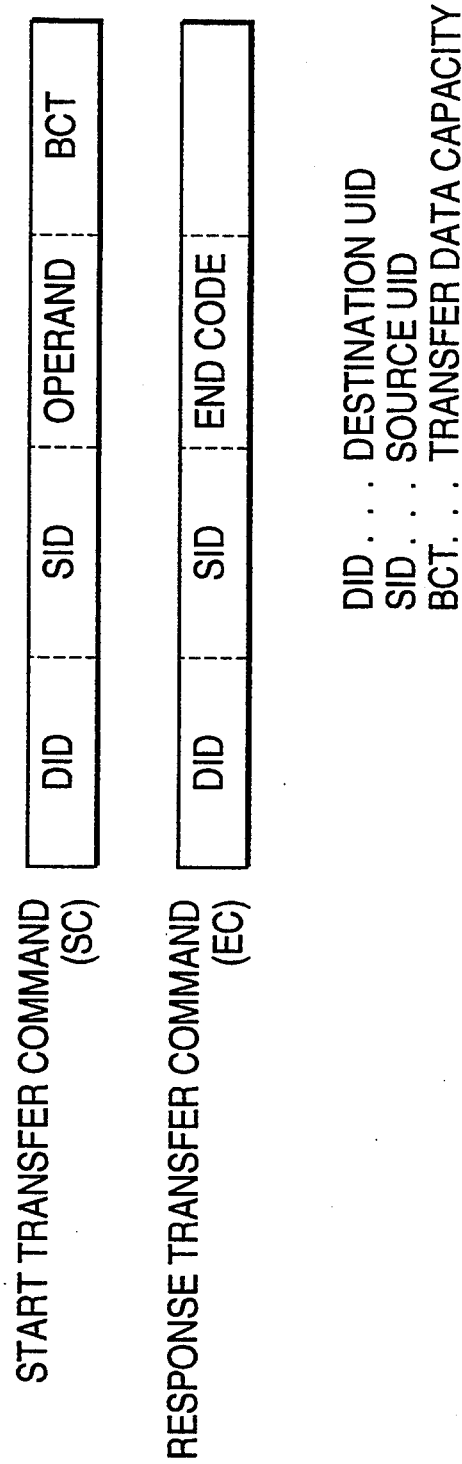
FIG. 7 is a diagram for explaining transfer commands on the system bus according to the present invention.

FIG. 7 illustrates examples of a start transfer command SC and a response transfer command EC used by the connection units 22 and 28.

In the start transfer command SC of FIG. 7, the DID (Destination ID) indicates the unit ID of a destination module and the SID (Source ID) indicates the unit ID of a source module. The operand indicates a type of access. The types of access include memory access to the shared storage modules 12, control register access to the shared storage modules 12 and the other processor modules 10 to halt or reset them and so on. The BCT (Byte Count) indicates data capacity in accessing the shared storage modules 12.

In the response transfer command EC, the DID and SID are the same as those in the start transfer command SC and the end code indicates a conclusion state of the destination, i.e., normal conclusion or abnormal conclusion.

Figure 8:
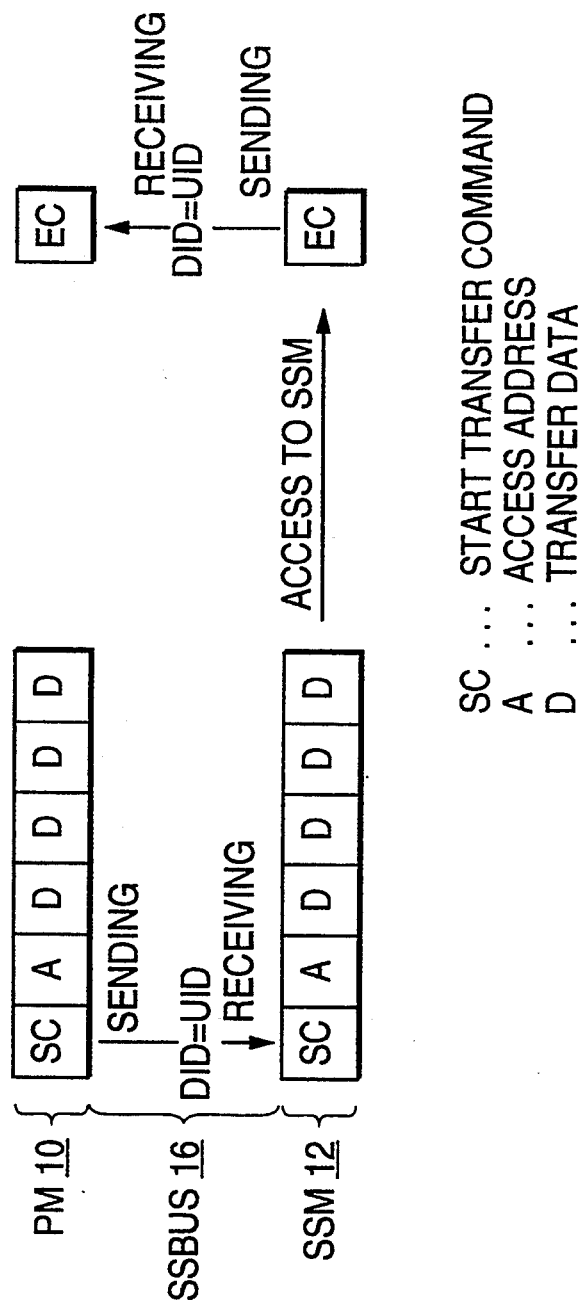
FIG. 8 is a diagram for explaining writing and transfer operations according to the present invention.

FIG. 8 is a diagram for explaining the operation of write access (store access) for transferring data from a source processor module 10 to a shared storage module 12 over the shared system bus 16 and writing it in the shared storage 12.

First, the source (accessing) processor module 10 generates a start transfer command SC. That is, the transfer start command SC generated by the source processor module consists of the SID indicating its own unit ID, the DID indicating the unit ID of a shared storage module 12 being accessed, an operand indicating the write access and the BCT indicating the access capacity. Following the transfer start command SC, an access address A of the destination shared storage module 12 and data D to be written into are sent onto the system bus 16.

The destination shared storage module 12 monitors the shared system bus 16 and compares the DID indicating the destination contained in the start transfer command SC with its own unit ID. When a coincidence occurs, the shared storage module 12 performs a accepting operation. The shared storage module 12 then makes a write access to the shared storage unit 26 (refer to FIG. 4) and transmits to the source processor module 10 a response transfer command EC including the end code of the write access and in which the DID and SID are interchanged because the start transfer and the response transfer are opposite to each other in the direction of transfer.

The source processor module 10 monitors the shared system bus 16 and performs the accepting operation when a coincidence occurs between the destination ID in the response transfer command EC and its own unit ID, thereby terminating one-time access.

During the idle time from the termination of transmission of the start transfer command SC to the initiation of the transmission of the response transfer command EC, the system bus may be used to transfer the start transfer command SC or the response transfer command EC for another access.

Figure 9:
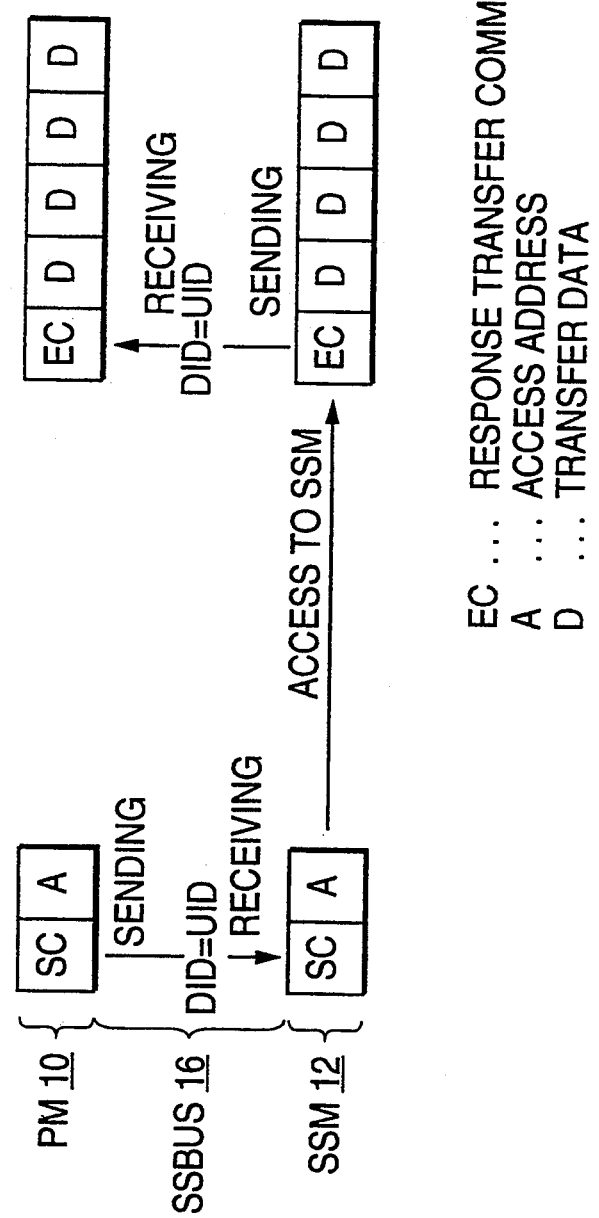
FIG. 9 is a diagram for explaining reading and transfer operations according to the present invention.

FIG. 9 is a diagram for use explaining the operation of read access (fetch access) for reading data from a shared storage module 12 and transferring it to a processor module 10.

First, a source processor module 10 generates a start transfer command SC which consists of the SID indicating its own unit ID, the DID indicating the unit ID of a destination shared storage module 12 being accessed, an operand indicating the read access and the BCT indicating the access capacity. Following the transfer start command SC, an access address A of the shared storage module 12 being accessed is sent onto the system bus 16.

The destination shared storage module 12 monitors the shared system bus 16 and compares the DID in the start transfer command SC with its own unit ID. When the comparison indicates equality, the module 12 performs the accepting operation. The destination shared storage module 12 then makes read access to the shared storage unit 26 (refer to FIG. 4) of the shared storage module 12 and transmits to the source processor module 10 a response transfer command EC, which contains the end code of the read access, and readout data D. In the response transfer command EC, the DID and SID are interchanged because the start transfer and the response transfer are opposite to each other in the direction of transfer.

The source processor module 10 monitors the shared system bus 16 and performs the accepting operation when a coincidence occurs between the destination ID in the response transfer command EC and in its own unit ID, thereby terminating one-time read access.

The read access is made in the program access mode or the DMA access mode. In either access mode, the operations on the system bus 16 are the same.

Address Space

Figure 10:
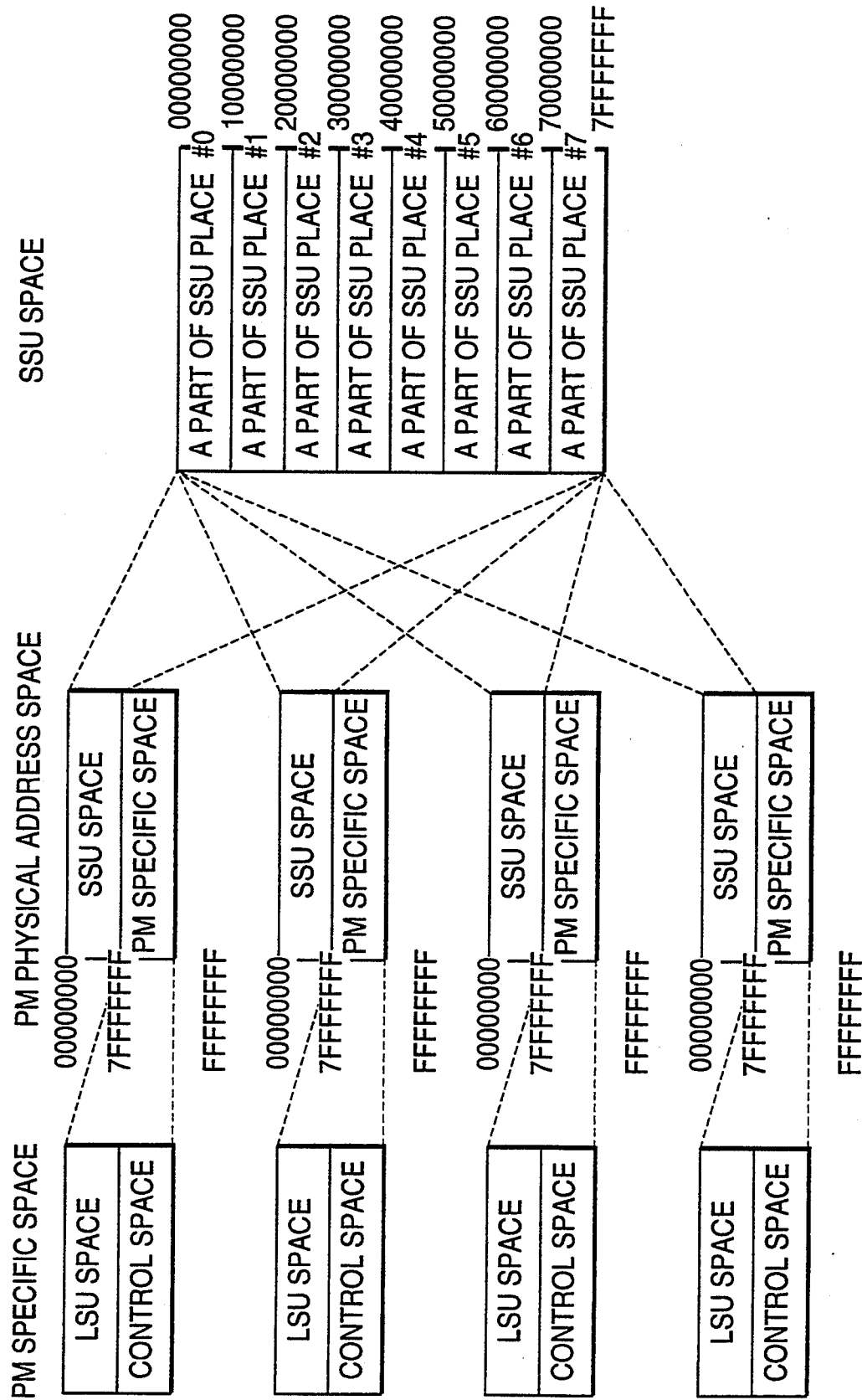
FIG. 10 is a diagram for explaining an address space map according to the present invention.

FIG. 10 is a diagram for explaining an address space map in the present embodiment of the present invention.

In FIG. 10, the physical address space of each processor module is roughly classified into shared storage module space (hereinafter referred to as SSU space) and space inherent in the processor module (hereinafter referred to as PM inherent space).

The PM inherent space is space which is inherent in hardware resources of each processor module 10 and presents in each processor module 10. The PM inherent space forms multiple-address space for the total number of processor modules in the system. In the present embodiment, it is supposed that the amount of PM inherent space is 2GB.

The SSU space is common to all the processor modules 10. That is, the SSU space is formed by more than one shared storage module 12 and forms space which is common to the processor modules 12 in the system; it can also be directly accessed by the physical addresses of the processor modules 10. Thus, only data to be shared among all the processor modules 10 is stored in the SSU space.

In the present embodiment, the 2-GB SSU space is used as an example. As shown on the right side of the figure, the SSU space is further divided into eight partial SSU spaces #0 to #7 in a 256-MB unit. Each of the partial SSU spaces #0 to #7 is formed from one of the shared storage modules 12 of the present invention.

Moreover, the PM space of each processor module 10 is divided into LSU space and control space. Operands required by each processor module and its own data are stored in the LSU space, which is a part of the PM inherent space. It is the presence of the LSU space that permits the number of accesses made by each processor module to the SSU space (formed by the shared storage modules 12) to be decreased.

If an access address designated by the central processing unit 18 of each processor module points to the LSU space, then closed access will be made within the processor module 10.

When the access address (physical address) designated by the central processing unit 18 points to the SSU space, the connection unit 22 of the processor module 10 recognizes that the access is being made to the SSU space and accesses a corresponding shared storage module 12 via the system bus 16.

By mapping the SSU space and the LSU space into the physical address space on the processor modules 10, it becomes possible for software to access the SSU space and the LSU space without needing to switch between the SSU space and the SSU space.

Since the SSU space is directly mapped into the physical address space of each processor module 10 as shown in FIG. 10, access to the SSU space formed of more than one shared storage module 12 may be made in the following two access modes.

① Program mode in which physical addresses are used to make direct access by software instructions of the central processing unit 18; or ② DMA mode in which a shared storage module to be accessed is selected and a data transfer between a processor module 10 and the shared storage module 12 is started by specifying an access address and the length of transfer.

The accessible SSU space varies with the access mode. In the present embodiment, the SSU space accessible by the program mode is only the 2-GB space which has been directly mapped into the physical address space of each processor module. In the DMA mode, however, by designating a shared storage module 12 to be accessed using its unit ID, it becomes possible to access much vaster SSU space, i.e., extended SSU space.

In the DMA mode access, the unit ID of a shared storage module 10 to be accessed is designated by the DIDI in the start transfer command SC shown in FIGS. 8 and 9 and the shared storage module is addressed by the following address A. Therefore, theoretically, it becomes possible to access extended SSU space having a capacity of $2^n$ (n is an address bit width of central processing unit 18 plus a bit width of the unit ID). That is, the extended SSU space forms extended spaces which are distinguished by the unit ID numbers serving as identifiers.

Figure 11:
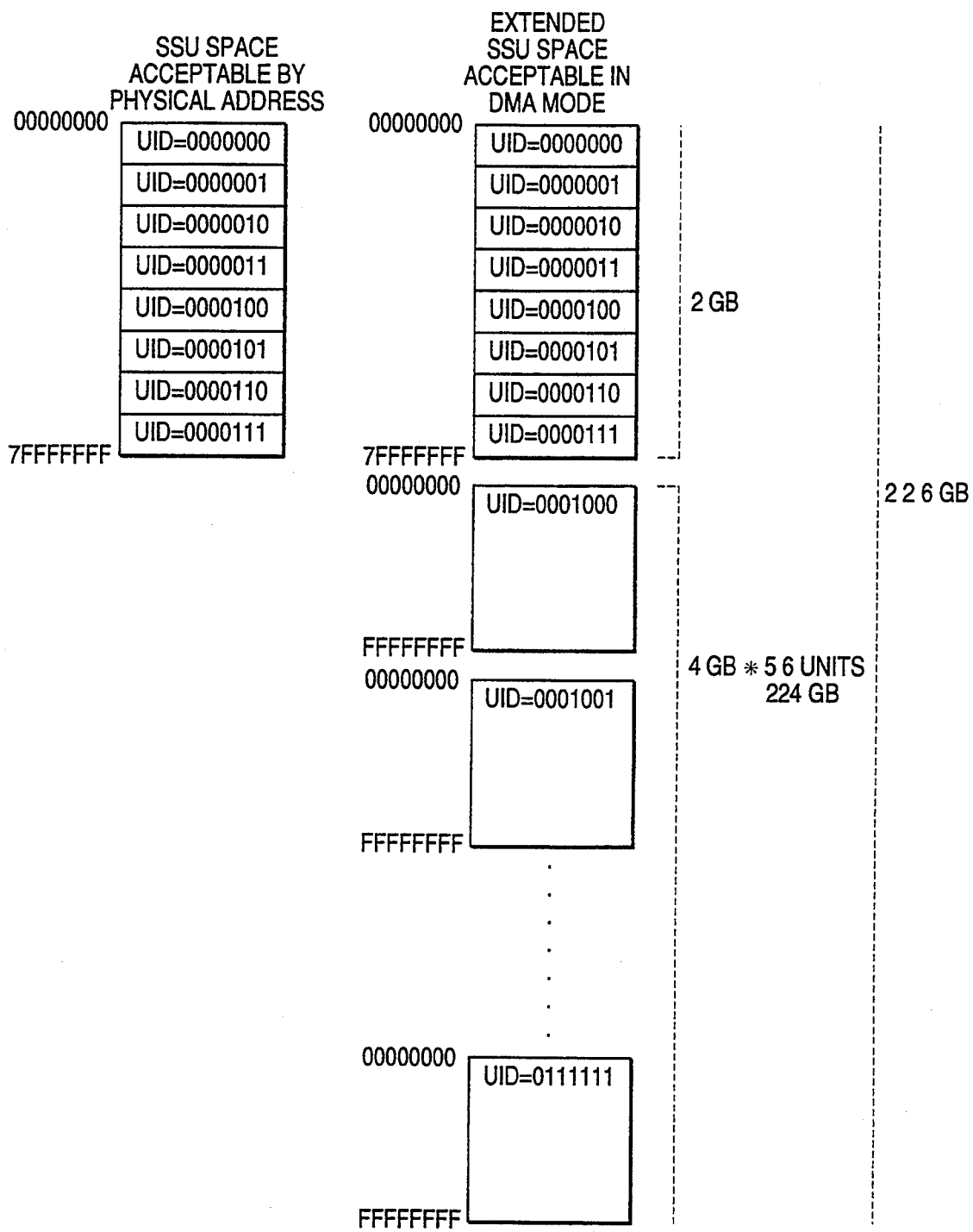
FIG. 11 is a diagram for explaining extended SSU space according to the present invention.

FIG. 11 is a diagram for explaining the SSU space which has been mapped into the physical address space of the processor module 10 and the extended SSU space which is accessible only in the DMA mode.

In FIG. 11, the number of bits of each of the unit ID numbers of the shared storage modules 12 constituting the extended SSU space is seven, and 64 unit ID numbers, 0000000 to 0111111, are assigned to the shared storage modules 12.

Here, eight unit ID numbers, 0000000 to 0000111, which are accessible in the program mode and the DMA mode are assigned to the 2-GB physical address space to be used for configuration definitions of the shared storage modules 12 constituting duplicate-shared storage (described later). The remaining 56 unit ID numbers corresponding to 56 SSU modules used in DMA mode are each assigned 4 GB. As a result, the extended SSU space of 226 GB in total can be accessed in the DMA mode.

Of course, the number of unit ID numbers is not limited to eight as shown in FIG. 11, and 16 shared storage modules 000000 to 0001111, may be used to fully form dupliate-shared storage space (non-extended 2-GB space).

Moreover, by increasing the number of bits of the unit ID or the rate of assignment of the unit ID numbers to the shared storage modules 12, it is possible to extend the extended SSU space with the DMA mode access.

Although the SSU space of the present invention, which is accessible by the physical addresses, is formed by more than one shared storage module 12, all the memory devices for the SSU space need not be packaged; unpackaged areas may also exist. In addition, all or part of the SSU space may be duplicate-configured for fault-tolerance.

The unpackaged areas and the duplicate configuration, as shown in the SSU space of the processor modules 10 of FIG. 10, can be realized by dividing the SSU space of the processor modules 10 into partial SSU spaces and defining relationship with the shared storage modules 12 for each of the partial SSU spaces, that is, relationship with the shared storage modules 12 having the unit ID numbers 0000000 to 0000111 forming the extended SSU space shown in FIG. 11.

In the embodiment of FIG. 10, the 2-GB SSU space is divided into 8 spaces each of 256 MB and the configuration definitions indicating the correspondence relationship of each of the partial SSU spaces #0 to #7 to the shared storage modules 12 are given.

The configuration definitions of the shared storage modules 12 are realized by operating the configuration definition register 44 (refer to FIG. 5) built in each connection unit 22. The configuration register 44 is constructed from a first control register 60 shown in FIG. 12 and second control registers 62-1 and 62-2 shown in FIG. 13.

The first control register 60 of FIG. 12 specifies the presence or absence of the shared storage modules 12 corresponding to the SSU space divided into 8 spaces each of 256 MB as shown in FIG. 10, in other words, whether the shared storage modules 12 are packaged or unpackaged. In this embodiment, FIG. 12 indicates that five partial SSU spaces #0, #1, #2, #4, #7 corresponding to I0, I1, I2, I4, I7 each indicated by a high bit "1" have been packaged and three partial SSU spaces #3, #5, #6 corresponding to I3, I5, I6 each indicated by a low bit "0" have not been packaged.

The second control registers 62-1 and 62-2 shown in FIG. 13 specify which of the shared storage modules 12 correspond to the partial SSU spaces indicated by high bits in the first control register 60 and have thus been packaged, the simplex or duplicate configuration and the access sequence when the duplicate configuration is specified.

In this embodiment, only bits D0, D1, D2, D4, and D7 corresponding to the partial SSU spaces #0, #1, #2, #4 and #7 are valid and specify the configurations of corresponding shared storage modules 12 and access forms. That is, bits D0, D1 and D7 are 0s, indicating that the partial SSU spaces #0, #1 and #7 are of simplex configuration. When partial SSU spaces #0, #1 and #7 are accessed, the shared storage modules 12 identified by the unit ID=0, 1, 7 are accessed.

On the other hand, bits D2 and D4 are "1", defining the duplicate configuration. When the partial SSU spaces #2 and #4 of duplicate configuration are accessed, data is read from the shared storage modules identified by the unit ID2 and the unit ID4.

The shared storage modules of duplicate configuration are written into as follows. In the first writing, a shared storage module 12 identified by the unit ID in the second control register 62-1 and 62-2 is written into and, in the second writing, another shared storage module 12 is written into which has the unit ID in which a specific bit in the first unit ID, for example, the least significant bit is inverted.

A pair of duplex shared storage modules 12, which can be specified by the second control register 62-1 and 62-2 to take the duplex configuration, has unit ID numbers which are equal except for their least significant bits, e.g. 0000100 and 0000101.

In the embodiment of FIG. 13, two partial SSU spaces #2 and #4 are specified by bits D2 and D4=1 to take duplex configuration. For the partial SSU space #2, the following pair is set.

| Partial SSU space | Unit ID |
|---|---|
| #2 | 0000010 |
| #3 | 0000011 |

For the partial SSU space #4, the following pair is set.

| Partial SSU space | Unit ID |
|---|---|
| #4 | 0000100 |
| #5 | 0000101 |

Figure 14:
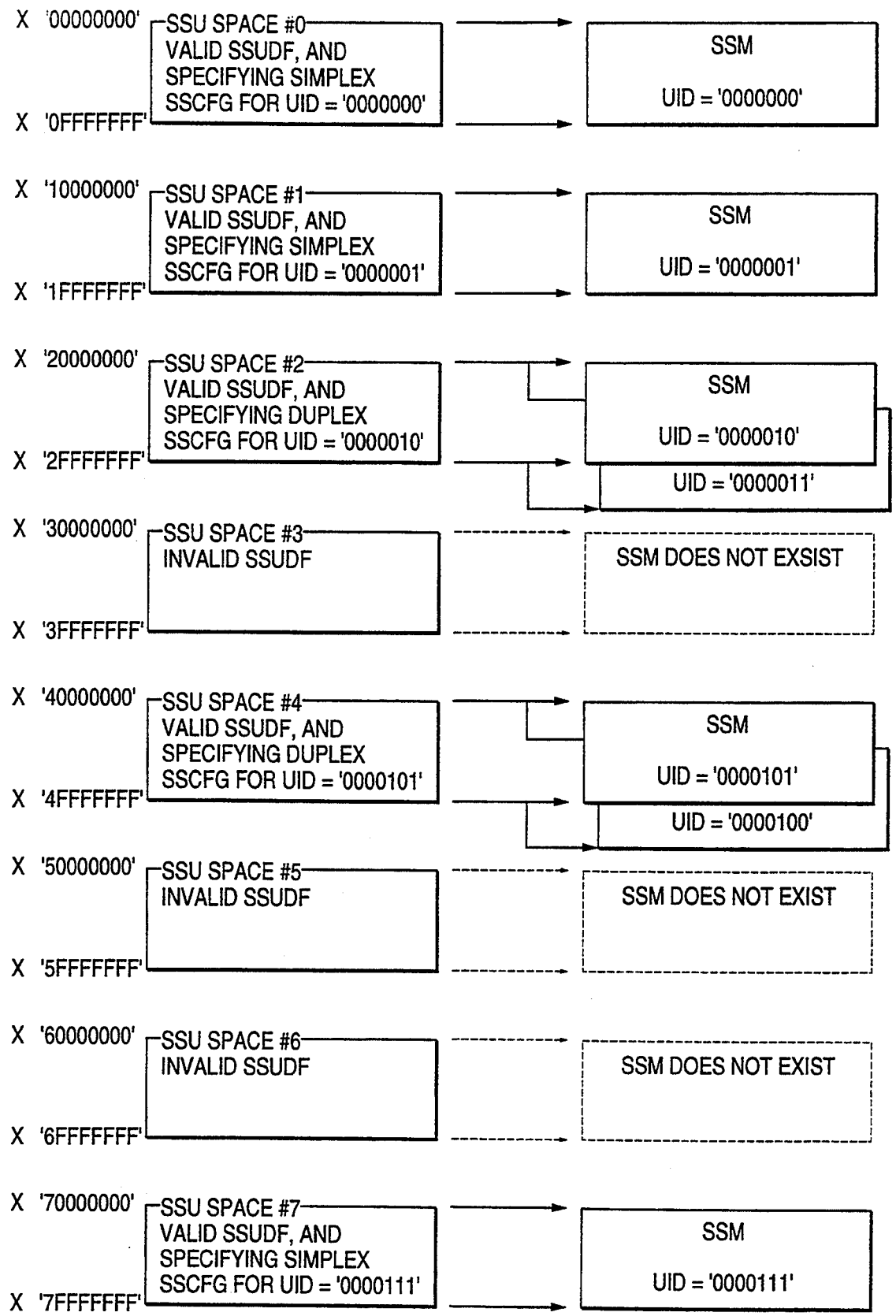
FIG. 14 is a diagram for explaining packaging of the shared storage modules corresponding to the configuration definitions of FIGS. 12 and 13.

FIG. 14 is a diagram for explaining the packaged state and configuration definitions of the shared storage modules 12 which are based on the specifications by the second control resisters of FIGS. 12 and 13.

Eight shared storage modules 12 are provided to correspond to the SSU spaces #0 to #7 of the processor modules 10, but the shared storage module corresponding to the SSU space #6 is not packaged. Since the SSU spaces #3 and #5 are duplicated with the shared storage modules of the SSU spaces #2 and #4, respectively, no shared storage modules 12 corresponding to the SSU spaces #3 and #5 exist. The remaining SSU spaces #0, #1 and #7 have a one-to-one correspondence with the shared storage modules 12 because of their simplex configuration.

By dividing the SSU space which can be accessed by the physical addresses of the processor modules 10 and giving configuration definitions thereof as described above, it becomes possible to specify validity/invalidity or simplex/duplex configuration of the shared storage modules for each of the divided SSU space units even when the system is implemented.

In this embodiment, in the program mode in which the SSU spaces are directly accessed by the physical addresses based on the central processing unit software instructions, four bits b0 to b3 in the 32-bit SSU space address serve as a selector for the shared storage modules 12 and the remaining 28 bits b4 to b31 serve as an address of the shared storage units 12.

Where the memory capacity built in the shared storage modules 12 exceeds 256 MB, the meaning of the selector for selecting from among the shared storage modules 12 remains unchanged, but the internal addresses of the shared storage modules 12 are made to correspond to the memory capacity built into the shared storage modules 12. When, for example, the memory capacity is 512 MB, i.e. double 256 MB. 29 bits b3 to b31 of address information are used to designate internal addresses of the shared storage modules 12. When the memory capacity is 1 GB, 30 bits b2 to b31 are used to designate internal addresses of the shared storage modules 12. Moreover, when the memory capacity is extended up to 2GB, 31 bits are all used to designate internal addresses of the shared storage modules. Where the memory capacity of the shared storage modules 12 exceeds 256 MB, the number of bits of the selector for selecting from among the shared storage modules decreases as described above. Thus, the same unit ID will be specified for the partial SSU spaces divided into 256-MB units.

Access Mode

Figures 1, 15A:
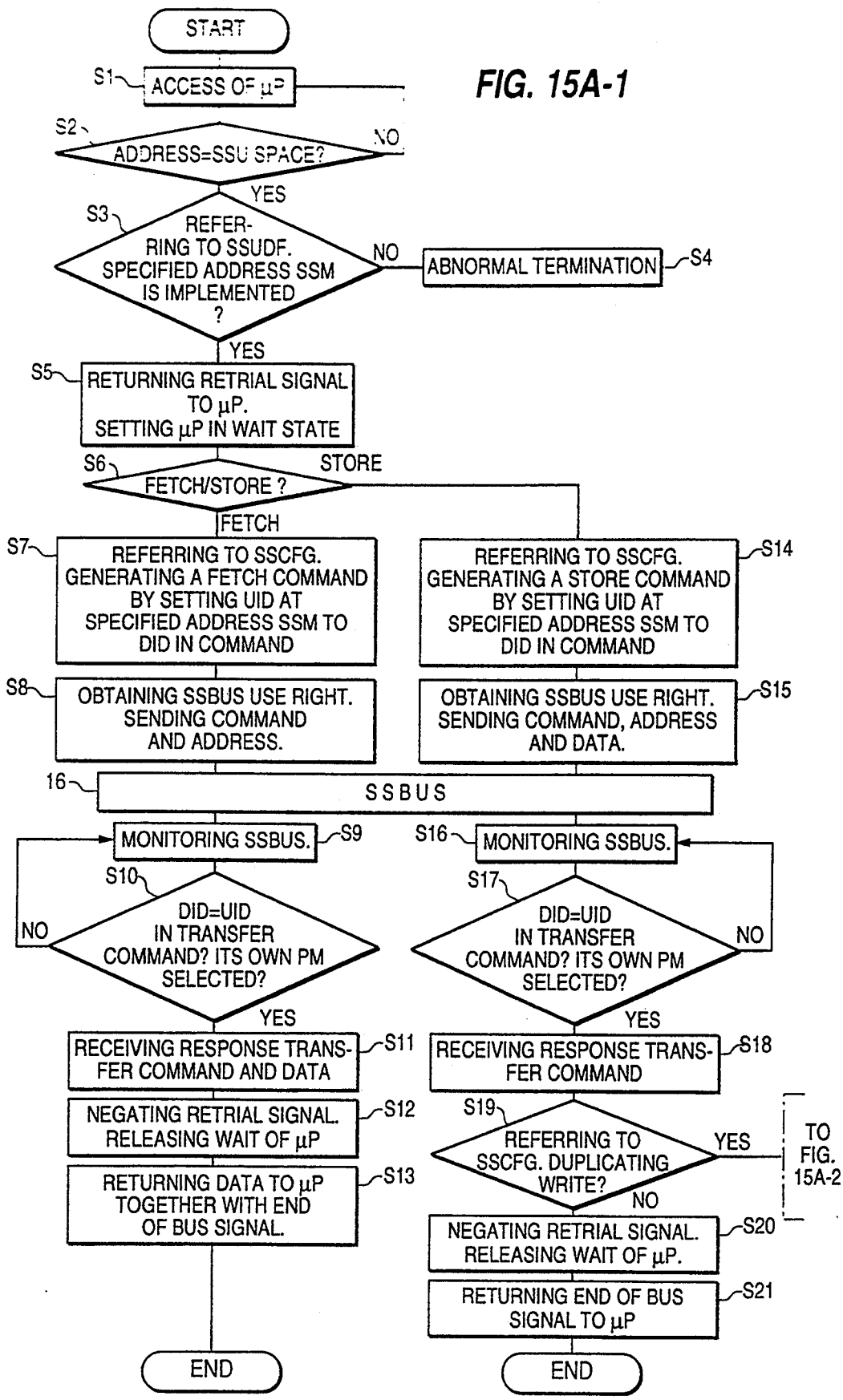
Figures 2, 15A:
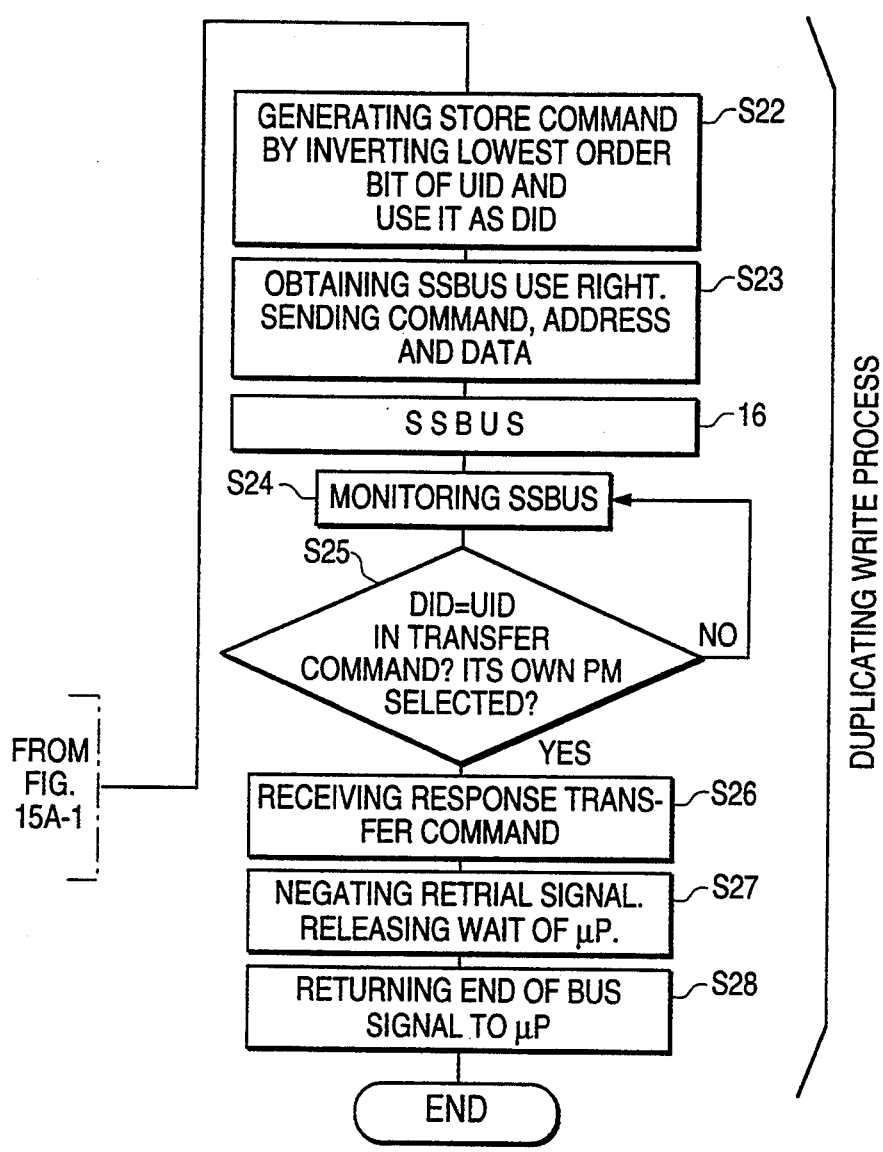
Figure 15B:
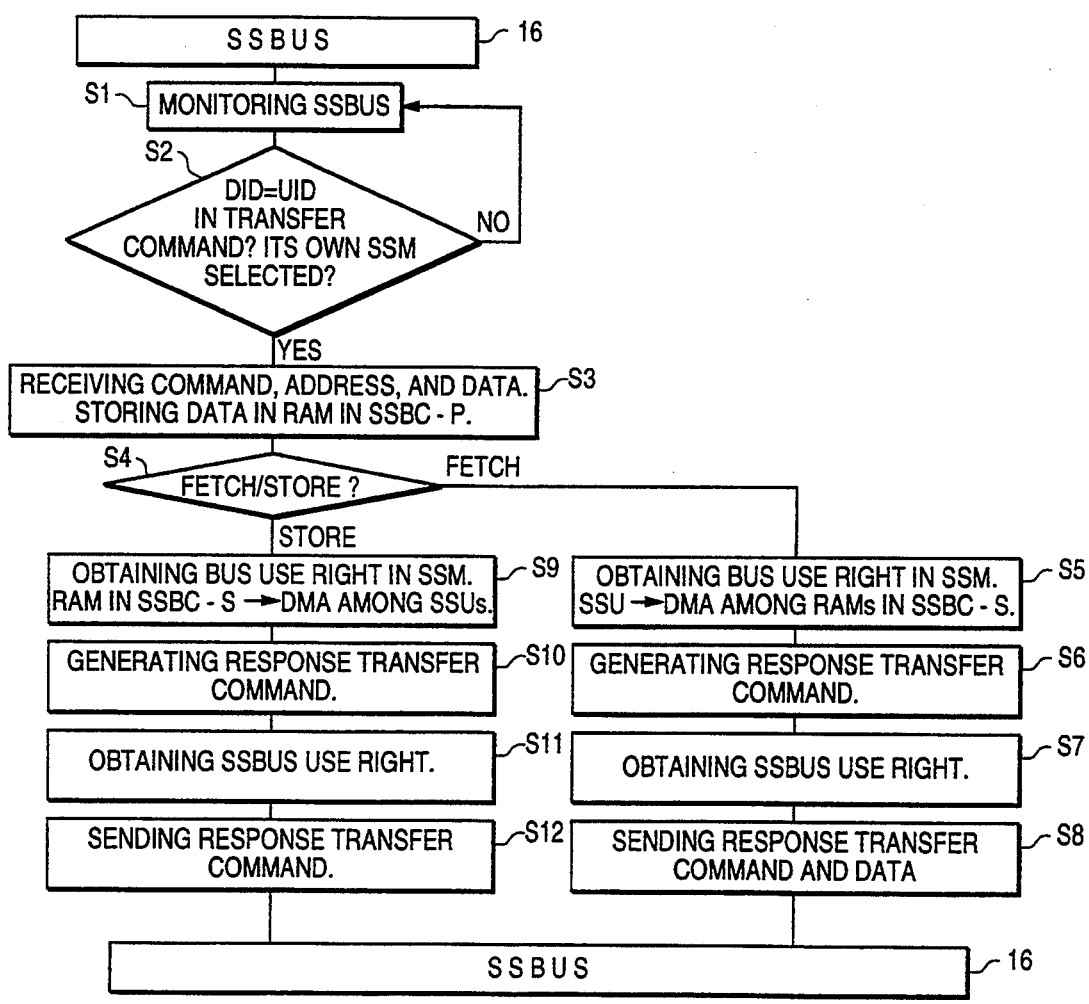

In the present invention, access in the program mode is made in accordance with flowcharts shown in FIGS. 15A and 15B.

In FIG. 15A, software accesses the SSU space as an instruction of the central processing unit 18 in step S1. In step S2, the connection unit 22 decides which of the shared storage units 12 has the addressed SSU space on the basis of four address bits b0 to b3 from the central processing unit 18 and the contents of the second control registers 62-1 and 62-2 for giving configuration definitions of the shared storage modules 12. Moreover, a decision is made in step S3 as to whether or not the shared storage module 12 specified by the contents of the first control register 60 has been packaged. If it has not, the operation will be terminated abnormally in step S4.

When it is decided in step S3 that the shared storage module 12 specified by the first control registers is packaged, the connection unit 22, in step S5, returns a retry signal to the central processing unit 18, so that the central processing unit 18 is placed in the wait state.

In step S6, a decision is made as to whether an instruction from the central processing unit 18 is a fetch instruction to read data from the shared storage module 12 or a store instruction to write data into the shared storage module 12.

If the instruction from the central processing unit 18 is a fetch instruction, a start transfer command SC is generated in step S7 from the contents of the second control registers 62-1 and 62-2 with the unit ID of the destination shared storage module used as the DID. After the bus right for the shared system bus 16 has been acquired in step S8, the start transfer command SC and address A are transmitted to the shared system bus 16.

If, on the other hand, it is decided in step S3 that the instruction is a store instruction, a start transfer command SC is likewise generated in step S14 from the contents of the second control registers 62-1 and 62-2 with the unit ID of the destination shared storage module used as the DID. In step S14, the start transfer command SC, address A and data D to be written into are sent onto the shared system bus 16 after acquisition of the bus right for the shared system bus 16.

In the shared storage module 12, on the other hand, as shown in the flowchart of FIG. 15B, the connection unit 28 monitors the shared system bus 16 in step S1 and compares its unit ID the DID in the start transfer command in step S2. When the comparison indicates equality, receive data is written into the built-in dual port RAM 56 in step S3.

In step S4, it is determined whether the instruction is a fetch instruction or a store instruction.

If it is a fetch instruction, the connection unit 28 permits data transfer between the dual port RAM 56 and the shared storage unit 26 under the control of the internal bus control circuit 64 in step 55 after acquisition of the bus right for the internal bus 30. In step S5, the connection unit 28 responds to the source processor module 10 at the termination of data transfer within the shared storage module 12.

That is, a response transfer commando EC containing a end code is generated in step S6, bus right for the shared system bus 16 is acquired in step S7, and then the response transfer command EC and readout data D are sent onto the shared system bus 16 in step S8.

If in step S4 the instruction is determined to be a store instruction, the connection unit 28 permits data transfer between the dual port RAM 56 and the shared storage unit 26 in step S9 under the control of the internal bus control circuit 64 after acquisition of the bus, right for the internal bus 30. The connection unit 28 responds to the source processor module 10 at the termination of the data transfer (the writing of data) within the shared storage module 12.

That is, a response transfer command EC containing a end code is generated in step S10, the bus right for the shared system bus 16 is acquired in step S11 and then the response transfer command EC is sent onto the shared system bus 16 in step S12.

Returning to the flowchart of FIG. 15A for the processor modules 10, the connection unit 22 monitors the shared system bus 16 as indicated in step 89 or S16 and compares its own unit ID with the DID in the response transfer command EC in step S10 or S17. When the comparison indicates equality in step S10 or S17, the response transfer command EC and data D are received in step S11 for a fetch instruction or the response transfer command EC is received in step S18 for a store instruction.

In subsequent step S12 or S20, a retry signal issued to the central processing unit 18 is withdrawn, so that the wait state of the central processing unit 18 is canceled. For a fetch instruction, a end signal DC of the internal bus 24 is returned to the central processing unit 18 together with received data D in step S13. For a store instruction, a end signal DC of the internal bus 24 is returned to the central processing unit 18 in step 20.

One access in the program mode is thus terminated.

The duplex writing process in steps S19 and S22 to S28 of FIGS. 15A will be clarified later.

Figures 1, 16A:
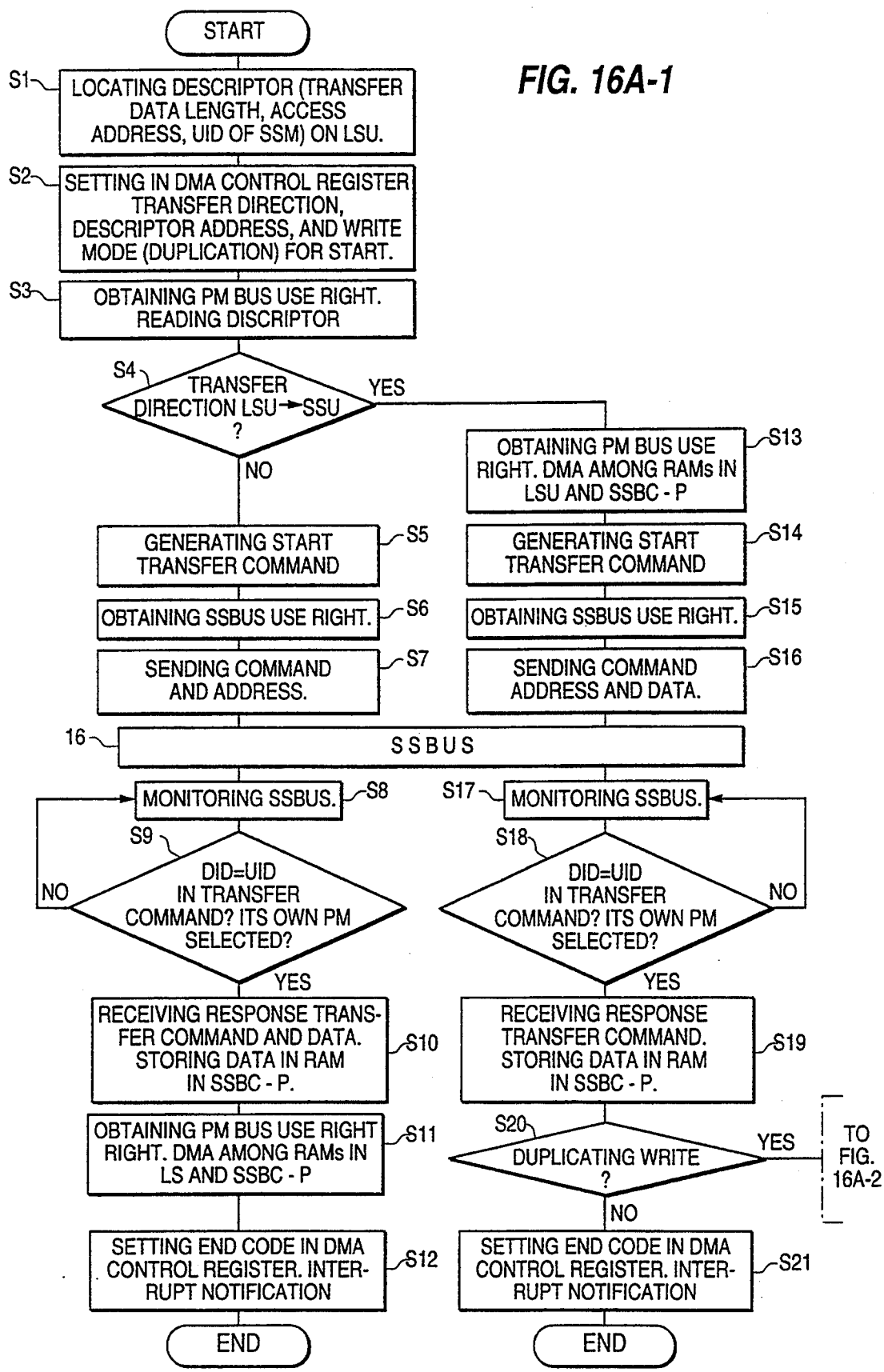
Figure 16B:
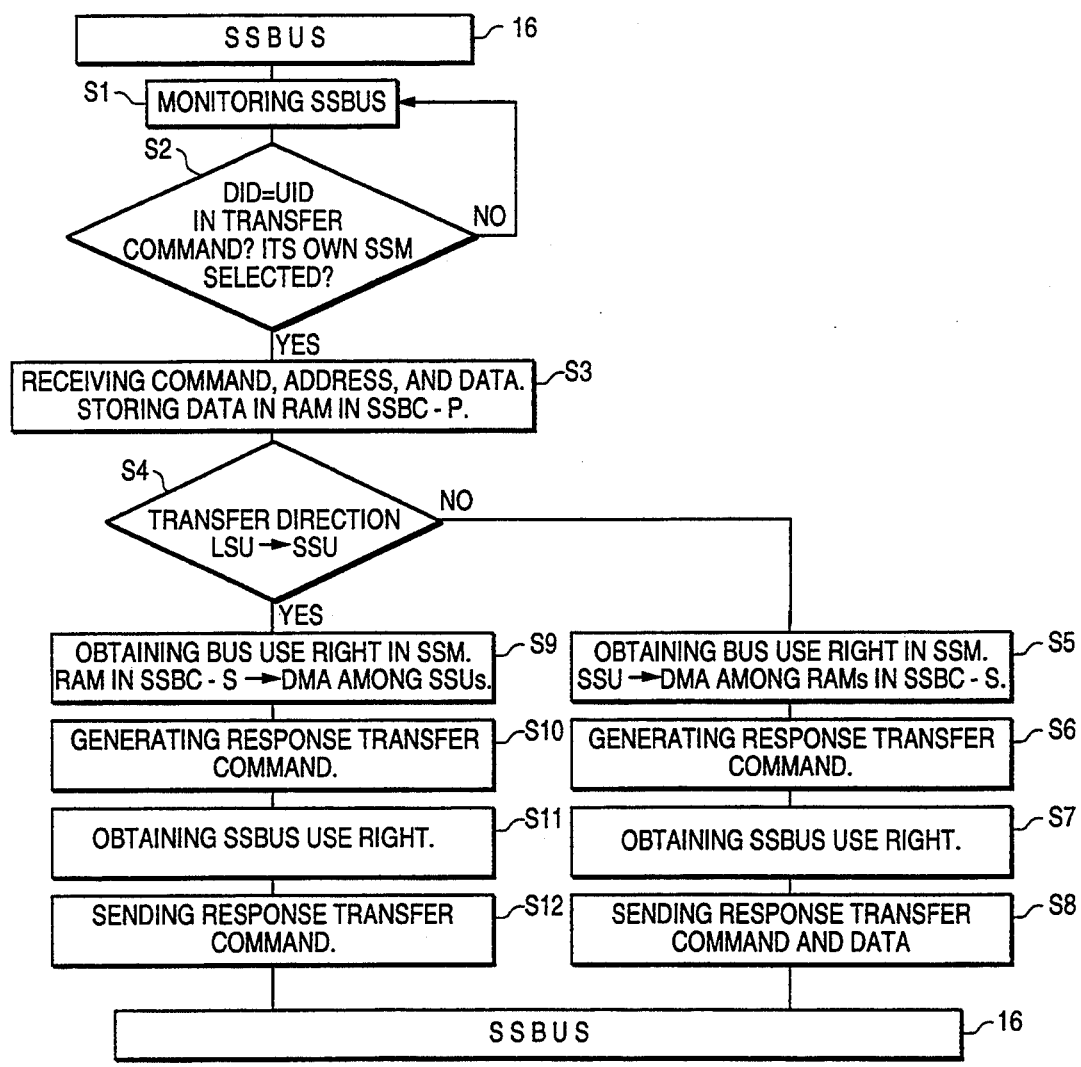

Next, reference is made to the flowcharts of FIGS. 16A and 16B to describe access in the DMA mode of the present invention.

For access in the DMA mode, in step S1, the central processing unit 18 first places on the main memory 20 of the processor module 10 a descriptor containing control contents, such as the unit ID of a destination shared storage module 12, an access address, the transfer length, etc., shown in FIG. 17.

That is, in the descriptor of FIG. 17, the BCT (Byte Count) indicates the number of transfer bytes, the buffer address BUFA indicates the start physical address of the data buffer placed on the local storage unit 20, and the DID indicates the unit ID of a shared storage module which is a candidate for access. Moreover, the SSUA indicates a relative address (an internal address within the shared storage module 12 specified by the DID) within the shared storage module 12 to be accessed, which differs from the physical address of the SSU space in the program mode.

After placement of the descriptor in step S1, the direction of transfer, control such as duplex writing into the shared storage modules 12 and the address of the descriptor on the local storage unit 20 is set in the DMA control register 50 of the DMA control circuit 34 in the connection unit 22 in step S2, thereby starting DMA mode access.

When the DMA mode access is started in step S2, the connection unit 22 acquires the bus right for the internal bus 24 of the processor module 10 and becomes a bus master. Thus, the connection unit 22 is permitted to directly access the local storage unit 20 under the control of the DMA control circuit 34 to thereby read the descriptor from the local storage unit 20 and permit data transfer from the local storage unit 20 to the dual port RAM 38 in the connection unit.

After termination of data transfer to the dual port RAM 38 in the connection unit 22, the direction of data transfer is checked in step S4. If the readout data transfer direction is from the shared storage module 12 to the local storage unit 20 (hereinafter referred to as (SSU - LSU) direction), a start transfer command SC containing the unit ID of the shared storage module 12 and the length of transfer as shown in FIG. 7 is generated by the transmitter-receiver circuit 36 in step S5. On the other hand, if the write data transfer direction is from the local storage unit 20 to the shared storage module 12 (hereinafter referred to as (SSU - LSU) direction), the transfer start command SC is likewise generated by the transmitter-receiver circuit 36 in step S13.

Subsequently, the transmitter-receiver circuit 36 acquires the bus right for the shared system bus 16 in steps S6 and S14.

If the transfer is in the (SSU - LSU) direction, the operation proceeds from step S6 to step S7, so that the start transfer command SC and the address A are sent onto the shared system bus 16. If the transfer is in the (LSU - SSU) direction, the operation proceeds from step S15 to step S16, so that the start transfer command SC, address A and data D are transmitted to the shared system bus 16.

On the other hand, the connection unit 28 of the shared storage module 12 monitors the shared system bus 16 in step S1 of FIG. 16B and compares its unit ID with the DID in the start transfer command DC in step S2. When the comparison indicates equality, the connection unit writes received data into the dual port RAM 56 in step S3.

Next, the transfer direction is checked in step S4. When the transfer is in the (LSU - SSU) direction, the operation proceeds to step S5. When the transfer is in the (SSU - LSU) direction, the operation proceeds to step S9. In step S5 or S9, the internal bus control circuit 64 of the DMA control circuit 52 in the connection unit 28 acquires the bus right for the internal bus 30, so that data transfer is permitted between the dual port RAM 56 and the shared storage unit 26. In this case, data is read from the shared storage unit 26 in step S5, while data is written into the shared storage unit 26 in step S9.

When access in the DMA mode is terminated in step S5 or S9, the response transfer command EC containing the end command shown in FIG. 7 is generated in step S6 or S10 and the bus right for the shared system bus 16 is acquired in step S7 or S11. Then, the operation proceeds to step S8 or S12. That is, in step S8 in which (LSU - SSU), readout data D is added to the response transfer command EC and-then transmitted to the shared system bus 16. In step S12 in which (SSU - LSU), the response transfer command EC is transmitted to the shared system bus.

Returning now to the flowchart of FIG. 16A for the processor modules 10, the connection unit 22 of the processor module 10 monitors the shared system bus 16 as in step S8 or S17. When equality is found between its unit ID and the DID in the response transfer command, the operation proceeds to step S10 or S19 for a receiving operation. The received data is stored in the dual port RAM 38 in the connection unit 22.

Subsequently, for transfer in the (SSU - LSU) direction, the bus right for the internal bus 24 is acquired in step S11, so that data D received by the dual port RAM 38 is transferred to the local storage unit 20 under the DMA control. Finally, the end code is set in the DMA control register 50 in step S12 and the completion is notified to the central processing unit 18 as an interruption signal.

For transfer in the (LSU - SSU) direction, the operation proceeds to step S21 via step S20, whereby the end code is set in the DMA control register 50 and the completion is notified to the control processing unit 18 as an interruption signal.

One-time access in the DMA mode is thus terminated.

The duplex writing process in steps S20 and S22 to S27 will be clarified later.

Duplex Access

The shared storage modules 12 constituting the SSU space of the present invention can be duplicated for fault-tolerance. When duplex shared storage modules 12 are accessed, the writing operation is performed on both of the duplex shared storage modules, while the reading operation is performed on one of the shared storage modules 12.

The write access to the duplex shared storage modules 12 is carried out by hardware control of the connection unit 22 in response to one access instruction from the central processing unit 18 based on software. The write access to the duplex shared storage modules 12 is not made simultaneously for reasons of hardware control. That is, the writing operation is first performed on one of the shared storage modules 12 and, when the first writing operation is completed, the other is written into. The specific accessing methods vary between the program mode and the DMA mode.

The duplex accessing method in the program mode is performed in accordance with the process in steps S19 and S22 to S28 shown in FIG. 15A, That is, the first store access is processed in the same manner as in the simplex configuration. When, in step S18, a response transfer command EC indicating normal termination is received at the termination of the first write access to the shared storage module 12, a reference is made in step S19 to the second control registers 62-1 and 62-2, which define configuration of the shared storage module.

Into the second control registers 62-1 and 62-2 are entered a bit for specifying the duplex configuration of shared storage modules, the unit ID of a shared storage module to be read from and the unit ID of a shared storage module to be written into first.

When a reference is made to the second control registers 62-1 and 62-2, if the shared storage module to be accessed is defined as simplex configuration, then the connection unit 22 terminates the write access to the shared storage module and the operation is proceeded to step S20.

When the duplex configuration is defined, in step S22, a transfer start command SC for store is generated as a DID of which is equal to the unit ID of the shared storage module, which is specified first in the second control registers and has already been subjected to access, except the least significant bit. In subsequent step S23, the bus right for the shared system bus 16 is acquired to transmit the start transfer command SC, address A and data D which is the same as that in the first access and accesses the other of the duplex-configured shared storage modules.

In the second access, with the first access, the process indicated in steps S1 to S4 and S9 to S12 of FIG. 15A is performed by the shared storage modules and, finally, a response transfer command EC containing a end code is transmitted to the shared system bus 16.

Data transferred from the shared storage module is monitored in step S24 of FIG. 15A and, when equality is found between its own unit ID and the in step S25, the response transfer command EC is accepted in step S26. Thereby, as in steps S12 and S13, a set of store accesses to the duplex-configured shared storage modules is terminated.

By setting configuration definitions of the shared storage modules 12 in the second control registers 62-1 and 62-2 as described above, when the central processing unit 18 makes program-mode access (access to the SSU space) to a physical address of a shared storage module 12 on the basis of software, the processor side connection unit 22 checks whether the shared storage unit 12 is of simplex configuration or duplex configuration and is able to automatically change the unit ID to make the second access at the termination of the first access if it is of duplex configuration.

Even if a shared storage module 12 specified in the second control registers 62-1 and 62-2 is defined as duplex configuration, one of the duplex shared storage modules may be disabled against access because of a fault therein. A situation in which a compressed operation has to be temporarily employed can be coped with by changing the operation mode of the second control registers from the duplex configuration mode to the simplex configuration mode when the abnormal end code is found in the response transfer command EC obtained at the termination of access.

When, at the time of double-mode access, access to shared storage modules 12 is terminated abnormally, it is possible to check the presence or absence of equality of the contents of two duplex shared storage modules as well as the access sequence based on the unit ID of the abnormal shared storage module 12 and the contents of the second control registers 62-1 and 62-2. In the program mode in particular, since the success or failure in access can be basically recognized on a word-by-word basis, even if data equality is lost between the duplex-configured shared storage modules 12, the recovery process has only to be performed taking into account unequal words and the shared storage module 12 which has failed to be accessed.

Next, the DMA-mode duplex accessing method is illustrated in steps S20, S22 to S27 of FIG. 16A.

That is, the first DMA access in which data transfer is in the (LSU - SSU) direction is processed in the same manner as in the simplex configuration. After a response transfer command EC indicating normal termination of the first access to the shared storage module 12 is received in step S19, the presence or absence of the definition of duplex writing is checked in step S20.

Although the DMA-mode access is started by selecting an object shared storage module 12 and specifying an access address of the shared storage module 12 and the length of transfer, the direction of transfer and simplex/duplex configuration are specified in the DMA control register 50 of the connection unit 22 every time started.

For this reason, in step S20, reference is to the DMA control register 50 defining the configuration of the shared storage module 12 to check the presence or absence of the definition of duplex writing.

As a result of the reference to the DMA control register 50, if the shared storage module to be accessed is defined as simplex configuration, the process advances to step 21 and the connection unit 22 terminates access to the shared storage module 12 with only one write access.

However, if the duplex configuration is defined, a transfer start command SC for writing is generated in step S22 and has the same DID as the unit ID of the shared storage module, which is first designated in the DMA control register 50 and has already been accessed, except the least significant bit. In subsequent step S23, the bus right for the shared system bus is acquired to transmit the start transfer command SC, address A and data D which is the same as that in the first access to the shared system bus 16, and makes DMA write access to the other of the duplex-configured memory modules.

In the second DMA access, as with the first, the process in steps S1 to S4 and S9 to S12 shown in FIG. 16B are performed by the shared storage modules and finally a response transfer command EC containing a end code is transmitted to the shared system bus 16.

That is, data transferred from the shared storage module is monitored in step S24 of FIG. 16A and, when an equality is found between its own unit ID and the DID in step S25, the response transfer command EC is accepted in step S26. As in steps S11 and S12, DMA access writing into the duplex shared storage modules is terminated in steps S26 and S27.

As with the duplex writing in the program mode, in the DMA mode as well, if the mode of operation is specified, the duplex writing is automatically performed by the hardware.

Where abnormal termination occurs during DMA access to the duplex shared storage modules, it is possible to check data equality between two duplex shared storage modules as well as the access sequence based on the unit ID being accessed and the least significant bit of the unit ID of the shared storage module specified at the time of the first access.

Exclusive Control of a Storage

Figure 18:
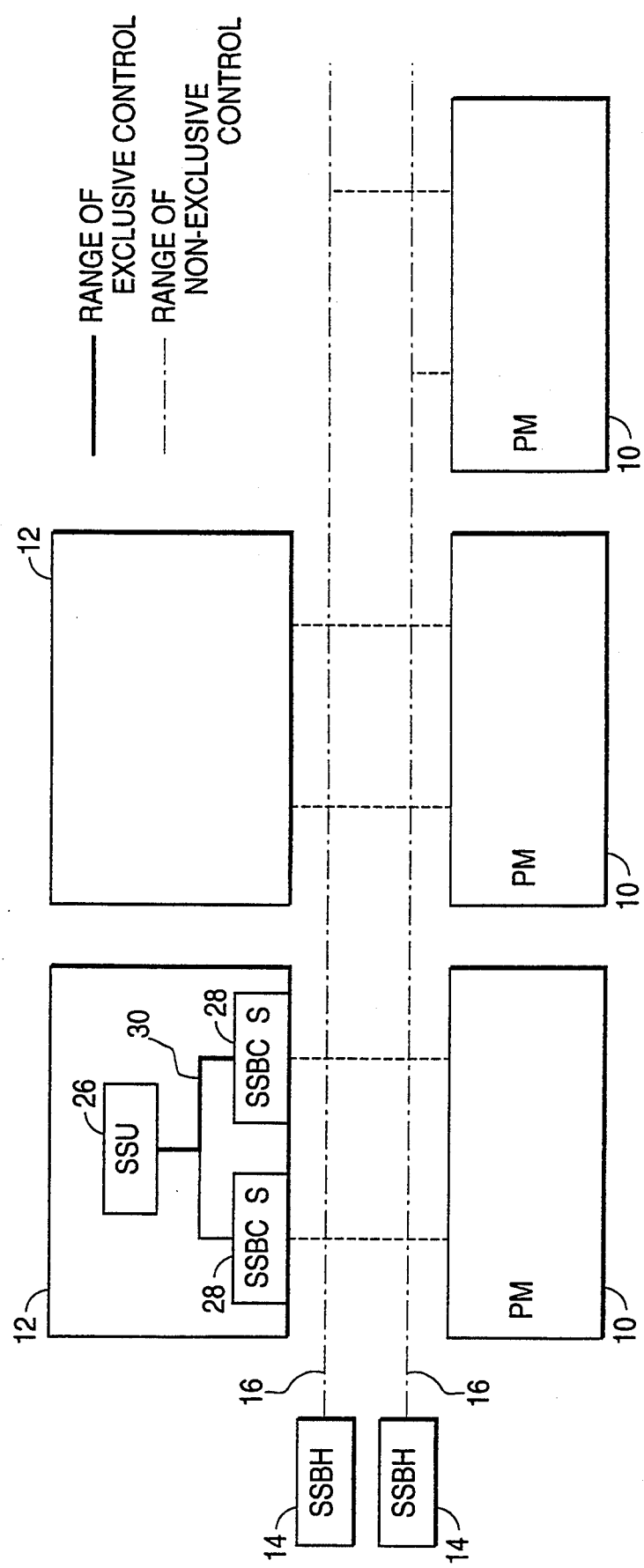
FIG. 18 shows a range of exclusive control on the side of a storage of the present invention.

FIG. 18 shows the range of the exclusive control performed by the shared storage exclusive control of the present invention by referring to the embodiment shown in FIG. 2.

Figure 19:
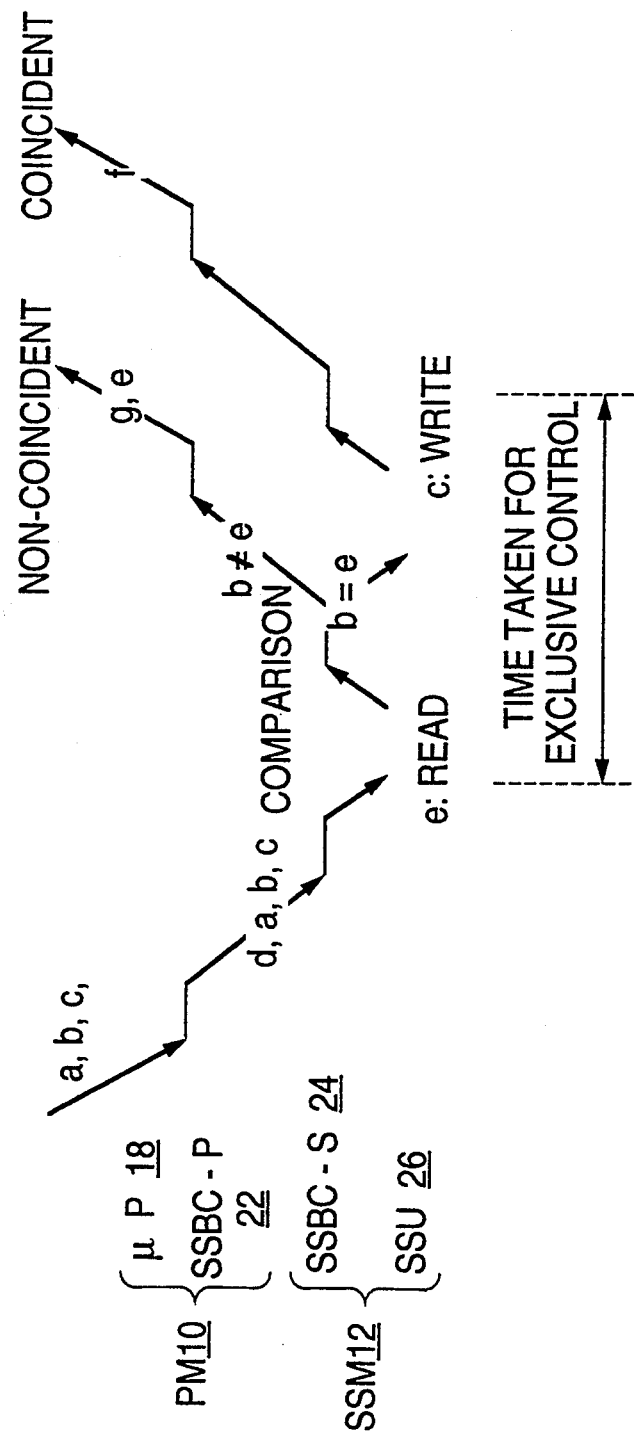
FIG. 19 shows an operational sequence of exclusive control on the side of a storage of the present invention.

FIG. 19 shows the operational sequence of the exclusive storage control.

A CSI (compare and store interlocked) instruction is a kind of exclusive instruction executed in a multiprocessor system having a general purpose central processing unit as a CPU, and rewrites an access address content after confirming that an access address in a shared storage space comprising shared storage modules 12 is controlled by a central processing unit 18 provided in a processor module 10 which is rewriting the address content.

That is, access address data are read from the shared storage module 12 according to the instruction of the processor module 10, and are sent to the accessing processor module 10. Then, they are compared with the data which are anticipated to be stored at the access address by the central processing unit 18 in the processor module 10. If they equate, the access address content is rewritten.

While the access address content is rewritten according to the coincident result of the comparison outputted by the accessing processor module 10 after the data are read at the access address in the shared storage module 12, exclusive control is performed such that the access address cannot be accessed by another central processing unit 18 in other processor module 10.

Figure 20:
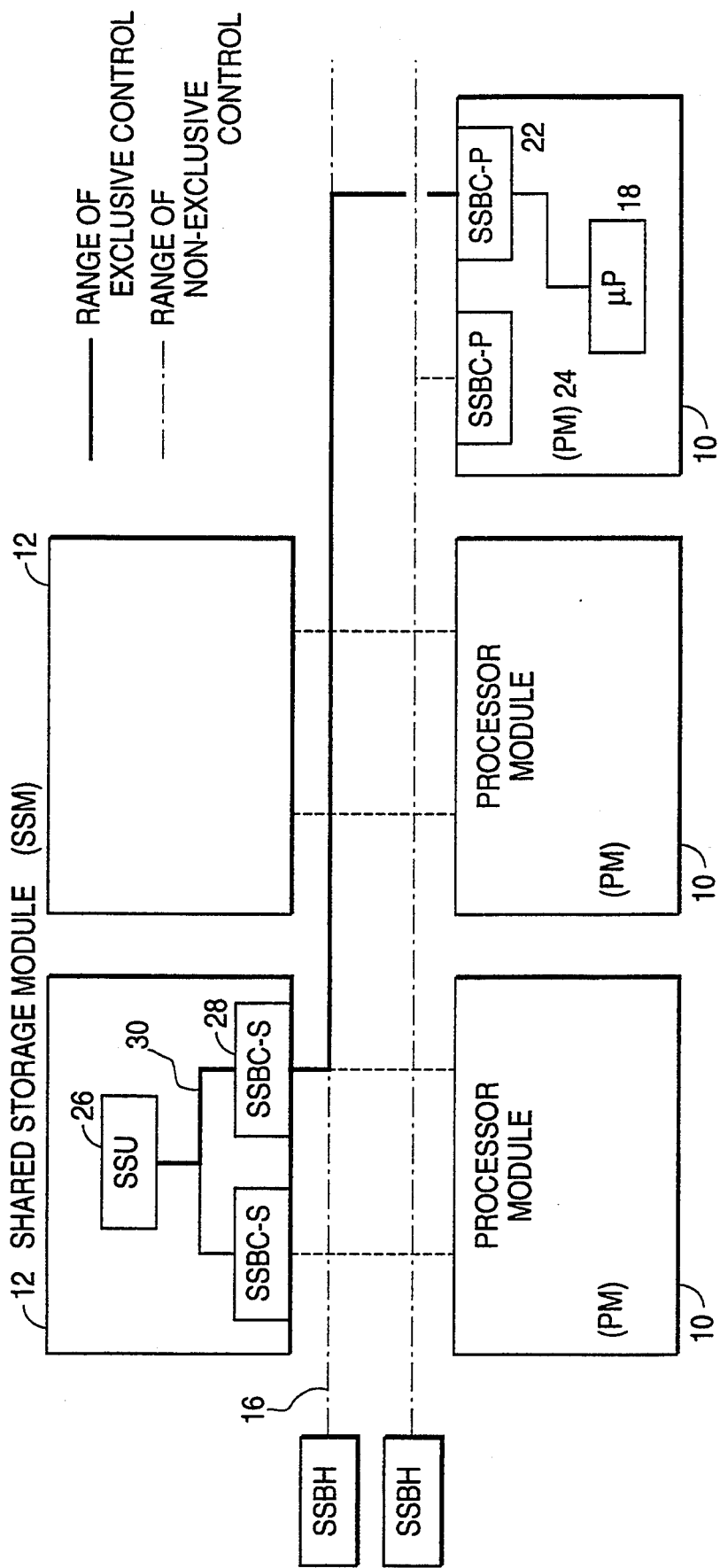
FIG. 20 shows a range of exclusive control on the side of a storage of the prior art technology.
Figure 21:
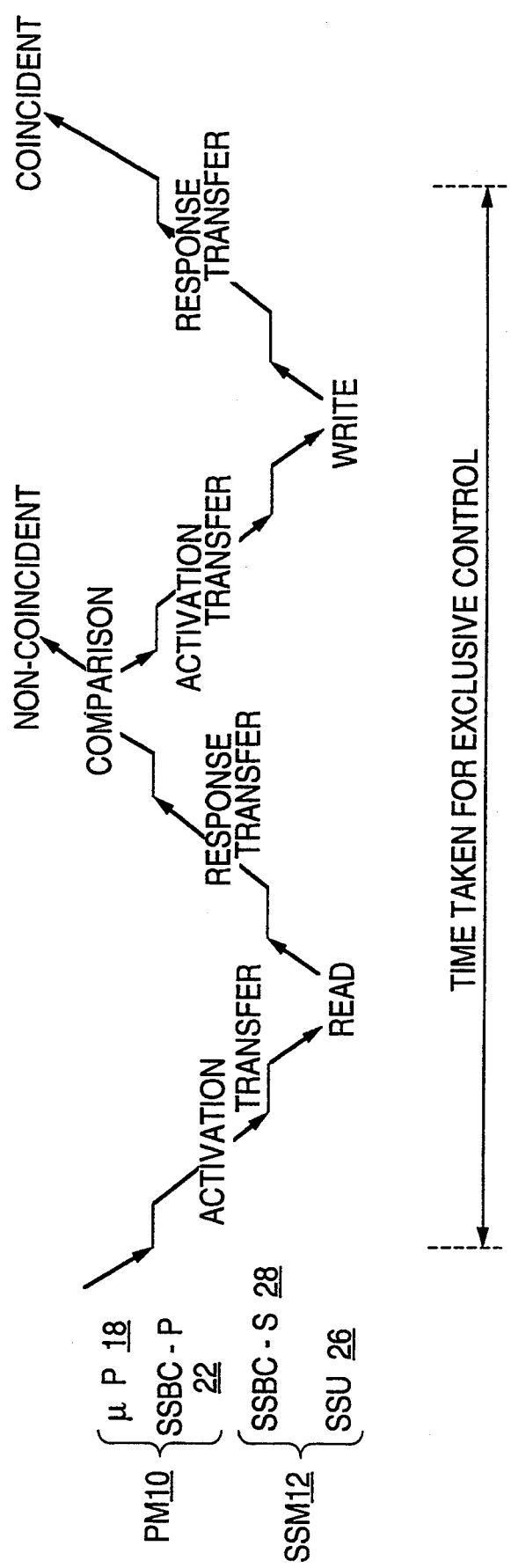
FIG. 21 shows an operational sequence exclusive control on the side of a storage of the prior art technology.

However, in the conventional method, the range of the exclusive control performed using an CSI instruction as shown in FIGS. 20 and 21 spans a large area containing the internal bus 24 in the processor module 10, the system bus 16, and the internal bus 30 in the shared storage module 12. Additionally, the exclusive control spans a long time taken for a read of a shared storage area from an activation transfer by an instruction of the central processing unit 18, comparison by the central processing unit 18, and a write to a shared storage area by an instruction of the central processing unit 18, and a write response transfer.

In the exclusive storage control of the present invention, data are compared according to a CSI instruction by the shared storage module 12, thereby limiting the range and shortening the time of engagement of the system.

FIG. 19 shows the operational sequence for explaining an embodiment of the exclusive storage control of the present invention.

In the exclusive control by a CSI instruction in the embodiment shown in FIG. 19, the central processing unit ($\mu$P) 18 in the processor module (PM) 10 writes to the CSI register provided in the connection unit (SSBC-P) 22 of the processor module 10 according to the software a physical address (a) in the SSU space (shared storage space) to be accessed, data to be compared (b) with the data stored at the access address in the shared storage module (SSM) 12, and data to substitute the access address data (c) when the comparison outputs a coincident result. Then, the central processing unit issues an operation activation instruction.

On receiving an activation instruction, the connection unit 22 in the processor module 10 generates an activation transfer command (d) including operands which indicates a CSI instruction for a storage exclusive control, like in the program mode access, and sends an activation transfer command (d), a physical address (a), comparison data (b), and substitiute data (c) to a specific shared storage module 12 having a physical address to be accessed. The connection unit (SSBC-S) 28 provided in the shared storage module 12 receives sending information (d, a, b, c) and executes the CSI instruction exclusively for a storage. That is, the connection unit 28 first reads from the shared storage unit 26 the data (e) of an access address (a) according to the CSI instruction for exclusively controlling a storage, and compares them with the comparison data (b). If the comparison results in coincidence, the substitute data (c) are rewritten for the access address (a). Then, a response transfer command (f) containing a normal termination code is returned to the accessing processor module 10.

If the comparison does not result in coincidence, an abnormal termination is assumed and a non-coincidence data (e) is returned to the accessing processor module 10 together with a response transfer command (g) containing an abnormal termination code.

The time taken for exclusively controlling the shared storage module according to the CSI instruction of the present invention is measured from reading data (e) from the shared storage unit (SSU) 26 and determining coincidence in the connection unit 28, and to writing the substitute data (c).

As shown in FIG. 18, the range of exclusive control is limited to the portion of the internal bus 30 indicated by the bold line in the shared storage module 12 to be accessed. While the exclusive storage control is performed, the shared system bus 16 can be used between another processor module 10 and another shared storage module 12.

The embodiment in FIG. 2 shows a plurality of processor modules 10. However, there can be a single processor module 10 in the system configuration.

Figure 22:
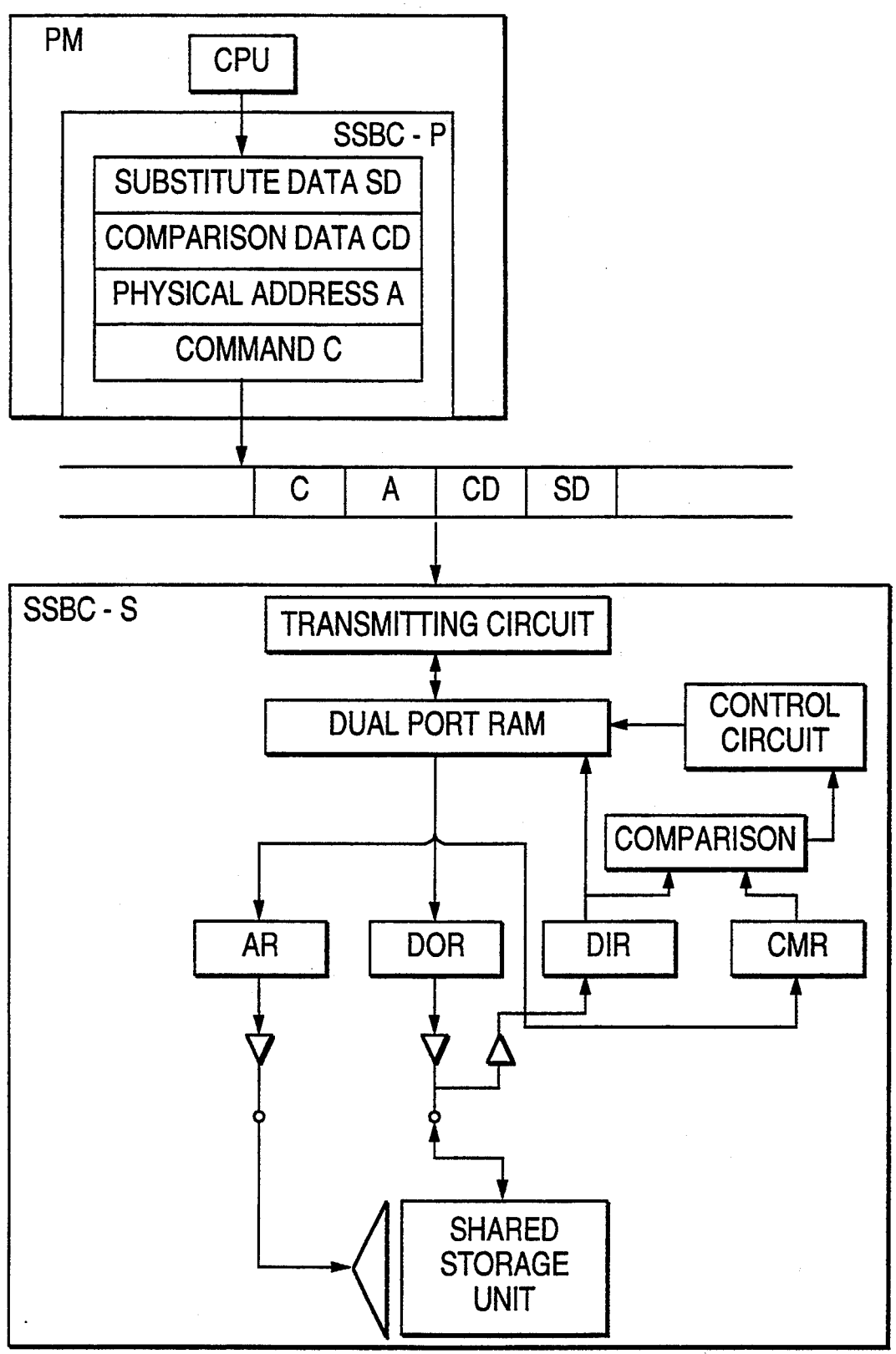
FIGS. 22 and 23 show an execution circuit and a timing chart of a CSI instruction.

FIG. 22 shows an executable circuit of a CSI instruction provided in the connection unit (SSBC-S).

In FIG. 22, the CPU provided in the processor module has a command (C), a physical address (A), comparison data (CD), and substitute data (SD) stored in the buffer of the connection unit (SSBC-P) according to the CSI instruction of the software. Then, the CPU issues a transfer activation instruction. The hardware receives the activation instruction and generates a bus command to send to a shared storage the command (C), the address (A), the comparison data (CD), and the substitute data through a system bus.

In the shared storage, when a CSI instruction is executed through the connection unit (SSBC-S), that is, when data read from a shared storage at the specified address (A) coincide with comparison data (CD), the substitute data (SD) are written.

The connection unit (SSBC-S) comprises a transmitting circuit for operating as an interface to a system bus, a dual port RAM connected to the output of the transmitting circuit, an address register (AR) connected to the output of the dual port ROM, a data output register (DOR), and a comparison register (CMR). Furthermore, the outputs of the address register (AR) and the data output register (DOR) are connected to an address of the shared storage and a data input/output terminal through buffers. The data input/output terminal of the shared storage is connected to a data input register (DIR) through a buffer, and the outputs of the data input register (DIR) and of the comparison register (CMR) are applied to the comparison circuit. In the comparison circuit, when it is determined that the data read from the shared storage are equal to the comparison data (CD), the comparison circuit activates the control circuit so that the subsitute data (SD) form the dual port RAM is stored in the physical address through the data output register (DOR). The status after the execution of the CSI instruction is sent to the PM through the data input register (DIR) and the dual port RAM. When data are read from a shared storage according to a read instruction issued by the CPU, the read data are transferred to the processor module (PM) through the dual port RAM and the data input register (DIR).

Figure 23:
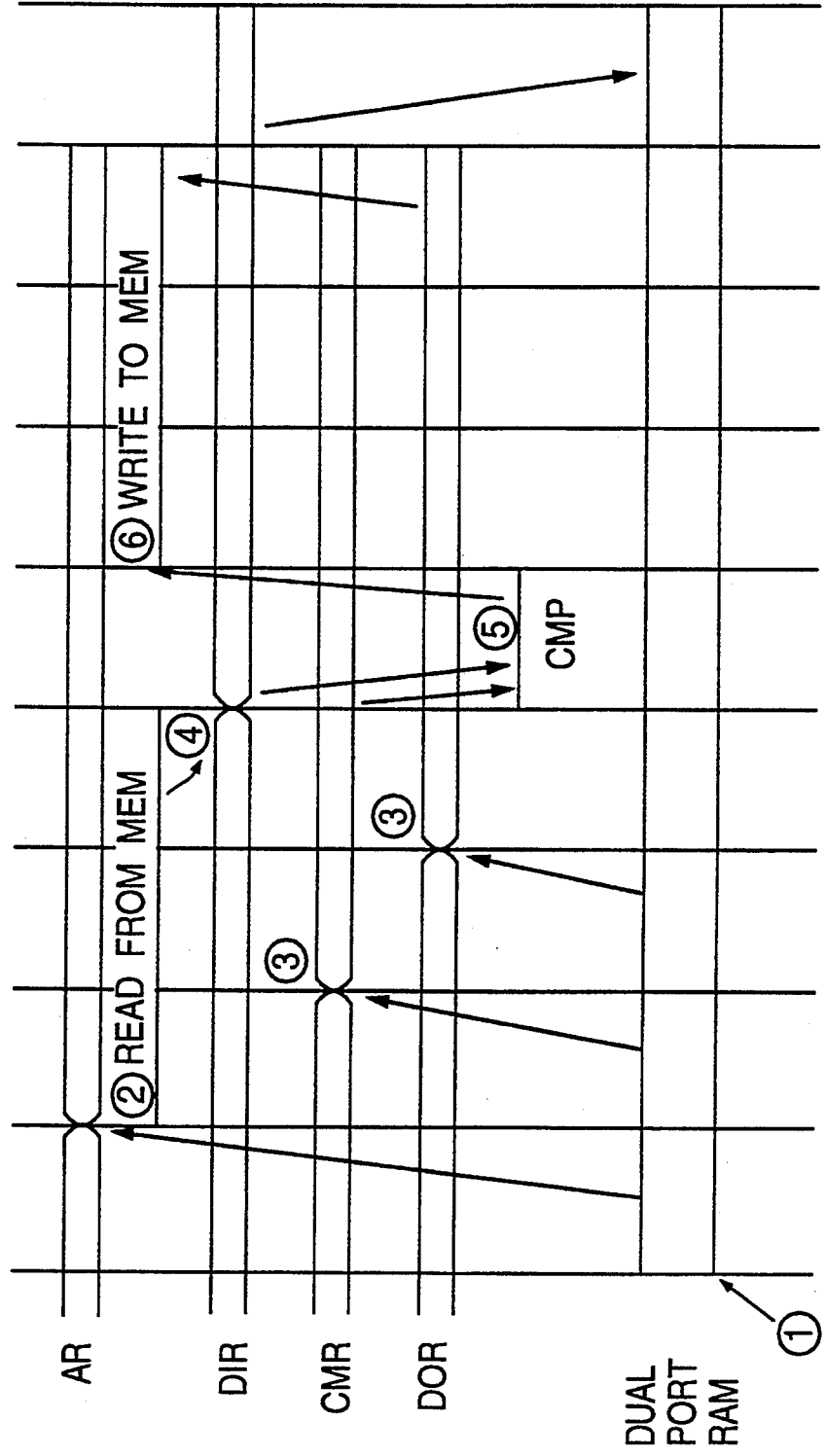

Next, the operation of a shared storage is explained below by referring to the executable circuit shown in FIG. 22 and the timing chart shown in FIG. 23.

In timing ①, a shared storage receives a command issued by a PM, stores an address, comparison data, and substitute data in a dual port RAM, and issues a process request to the control circuit. In timing ②, after storing the address in the register (AR), the control circuit activates a read operation from a storage. In timing ③, comparison data are stored in the CMR while data are read from a storage, and substitute data are stored in the DOR. In timing ④, the read data are stored in the DIR when all data are read from the storage. In timing ⑤, CMR is compared with DIR. In timing ⑥, if the comparison results in coincidence, data are written to a storage. If the comparison does not result in coincidence, data are not written to the storage. The DIR and a termination status are stored in the dual port RAM, and the status is returned to the PM.

Figure 24:
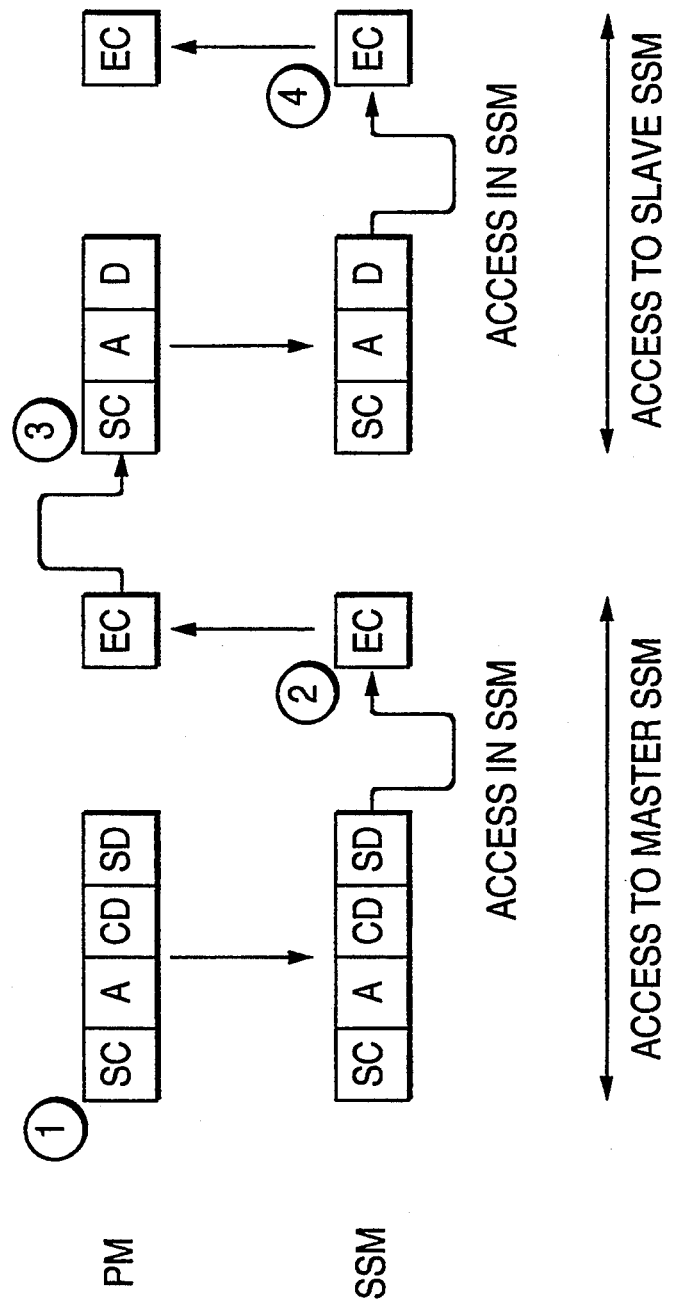
FIG. 24 shows duplex exclusive control of a CSI instruction.

Next, an exclusive control operation performed when substitute data are written to both the duplex shared storages is explained below by referring to FIG. 24.

①. A PM issues an exclusive control command to an SSM.

SC: Exclusive control indicated in its operand part
A: Access address
CD: Comparison data to be compared with the contents in an access address
SD: Substitute data when the contents in the access address coincide with the CD.

②. An SSM receives a command, performs an exclusive operation, and notifies in an end-of-operation code of an EC an end-of-operation state and the state of the exclusive control.

③. An SSBC-P interprets the contents of the EC, terminates the process when exclusive control is rejected, and issues a write command to an SSM when the operation terminates successfully, the exclusive control is accepted, and the SSM has duplex configuration.

SC: A write process in the operand part.
A: Access address (same as A in ①).

D: Substitute data (same as SD in ①).

④. The SSM receives a command, performs a writing operation and notifies in an end-of-operation code of an EC an end-of-operation state.

Possibility of Utilizing the Invention in the Industrial View

As described above, the present invention greatly shortens the time and limits the range of exclusive shared storage control executed with a CSI instruction, thereby improving system performance.

What is claimed is:

1. An exclusive shared storage control system in a computer system comprising:
   one or more processing modules (10) each having at least a local storage (20), a central processing unit (18), and a connection unit (22) for connection to a system bus (16), and
   one or more shared storage modules (12) each having at least a shared storage unit (26) and a connection unit (28) for connection to said system bus (16), wherein
   said connection unit (28) of said shared storage module (12) recognizes a CSI (compare and store interlocked) instruction and said central processing unit (18) of said processing module (10) reads and compares data in shared storage module (12) according to said CSI instruction, when said CSI instruction is executed to rewrite the data specified by an address in said shared storage module (12) only if said data read at said address coincide with the data anticipated by said central processing unit (18).

2. An exclusive shared storage control system in a computer system according to claim 1, wherein
   said connection unit (22) in said processing module (10) generates an activation transfer command comprising a destination ID code (DID) indicating a shared storage module (12), a source ID code (SID) indicating a sending processor module, an operand indicating said CSI instruction, and an access data capacity (BCT), and sends comparison data and substitute data together with said activation transfer command to said connection unit (28) of said shared storage module (12) to be accessed through said system bus (16).

3. An exclusive shared storage control system in a computer system according to claim 1, wherein
   said connection unit (28) of said shared storage module (12) reads data, compares them with comparison data, rewrites original data when said comparison results in coincidence according to said received activation transfer command, and exclusively controls an internal bus (30) of said shared storage module (12) while said data are read and rewritten.

4. An exclusive shared storage control system in a computer system according to claim 1, wherein
   said connection unit (28) of said shared storage module (12) generates a response transfer command containing a normal termination code when said data are successfully rewritten after said comparison resulting in coincidence, and sends it to said accessing processor module (10) through said system bus (16), or generates a response transfer command containing an abnormal termination code when said data cannot be rewritten as a result of non-coincident output of said comparison and sends it together with said read data resulting in non-coincidence to said accessing processor module (10) through said system bus (16).

5. An exclusive shared storage control system executed with a shared storage configuration according to claim 1, wherein
   said connection unit (28) of said shared storage module (12) monitors said system bus (16), and receives said activation transfer command when said destination ID code (DID) in said activation transfer command coincides with its own unit ID, and
   said connection unit (22) of said processor module (10) monitors said system bus (16), and receives said response transfer command when said destination ID code (DID) in said response transfer command coincides with its own unit ID.

6. An exclusive shared storage control system executed with a shared storage configuration according to claim 1, wherein
   means for performing said comparison process comprises:
   a RAM connected to a transmitting circuit for operating as an interface to said system bus;
   an address register for latching a physical address A outputted from said RAM and contained in said CSI instruction;
   a data output register (DOR) for latching substitute data (SD) in a CSI instruction through said RAM;
   a comparison register connected to an output terminal of said RAM to latch comparison data CD in said instruction;
   a data input register (DIR) connected to a data output terminal of a shared storage to latch the contents of the shared storage specified by the physical address A latched by said address register means;
   comparison circuit means for comparing data in said data input register (DIR) and said comparison register (CMR); and
   control means for controlling an operation of writing said substitute data (SD) into a shared storage specified by said address register (AR) when the data read from said shared storage coincide with said comparison data (CD) in said comparison circuit.

7. An exclusive shared storage control system executed with a shared storage configuration according to claim 1, wherein
   a CSI instruction comprising an SC, an A, a CD, and an SD is issued to said shared storage when substitute data are written in executing said CSI instruction to an SSM on the master side and an SSM on the slave side each specified by a physical address A in duplicated shared storage,
   a command part of a CSI instruction for exclusively controlling said CSI instruction is received on the side of a shared storage,
   said writing operation is performed on said master SSM and an end-of-operation state and the a success-or-failure result of exclusive control are notified by an end code (EC) to the PM side,
   a connection unit (SSBC-P) on the side of a PM which receives said end code interprets the contents of said end code,
   an operation is terminatnatnated when exclusive control can be performed,
   said substitute data comprising an SC, an A, and an SD without comparison data CD are sent to said shared storage side together with new substitute data when said operation terminates successfully and exclusive control can be performed, and
   said SSM on the slave side is provided with means for receiving said command, writing said substitute data at said physical address, and then sending said end-of-operation code indicating the end-of-operation state to the PM side.

* * * * *

UNITED STATES PATENT AND TRADEMARK OFFICE
CERTIFICATE OF CORRECTION

PATENT NO. : 5,377,324
DATED : December 27, 1994
INVENTOR(S) : Kabemoto et al

It is certified that error appears in the above-indentified patent and that said Letters Patent is hereby corrected as shown below:

```
    Column 1, line 15, delete "system," and insert --
system.--
    Column 1, line 49, after "module" insert --(PM)--
    Column 3, line 62, after "sequence" insert --of--
    Column 4, line 39, delete "unlit" and insert --unit--
    Column 5, line 13, after "54" insert --,--
    Column 5, line 22, delete "port-RAM" and insert --port
RAM--
    Column 9, line 61, delete "resisters" and insert
--registers--
    Column 10, line 26, delete "MB." and insert --MB,--
    Column 11, line 30, delete "55" and insert --S5--
    Column 11, line 56, delete "89" and insert --S9--
    Column 13, line 26, change "and-then" to --and then--
    Column 14, line 47, after "the" (first occurrence)
insert --D1D--
    Column 16, line 43, delete "access," and insert --
access--
    Column 20, line 26, after "said" insert --CSI--
```

Signed and Sealed this

Sixteenth Day of May, 1995

Attest:

BRUCE LEHMAN

*Attesting Officer*         *Commissioner of Patents and Trademarks*